(12) United States Patent (10) Patent No.: US 8,223,662 B2
Deshpande et al. (45) Date of Patent: Jul. 17, 2012

(54) CONCURRENT OPERATION IN MULTIPLE WIRELESS LOCAL AREA NETWORKS

(75) Inventors: Manoj Deshpande, San Diego, CA (US); Sanjiv Nanda, San Diego, CA (US); Arnaud Meylan, San Diego, CA (US); Atul Suri, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 1202 days.

(21) Appl. No.: 11/846,319

(22) Filed: Aug. 28, 2007

(65) Prior Publication Data

US 2008/0056133 A1 Mar. 6, 2008

Related U.S. Application Data

(60) Provisional application No. 60/841,105, filed on Aug. 29, 2006.

(51) Int. Cl.
*H04B 7/00* (2006.01)
(52) U.S. Cl. ......................................... 370/252; 370/338
(58) Field of Classification Search .................. 370/252, 370/338
See application file for complete search history.

(56) References Cited

U.S. PATENT DOCUMENTS

| | | |
|---|---|---|
| 6,259,898 B1 | 7/2001 | Lewis |
| 6,799,054 B2 | 9/2004 | Shpak |
| 7,065,376 B2 | 6/2006 | Wolman et al. |
| 2002/0131371 A1 * | 9/2002 | Rudnick ........................ 370/252 |
| 2003/0207698 A1 * | 11/2003 | Shpak ............................ 455/525 |
| 2004/0002330 A1 * | 1/2004 | Chitrapu .................... 455/426.2 |
| 2004/0064592 A1 | 4/2004 | Ishidoshiro |
| 2005/0122902 A1 * | 6/2005 | Guo et al. ..................... 370/229 |
| 2006/0104230 A1 * | 5/2006 | Gidwani ....................... 370/328 |
| 2006/0148534 A1 * | 7/2006 | Shih .............................. 455/574 |
| 2006/0227753 A1 * | 10/2006 | Vleugels et al. .............. 370/338 |
| 2007/0201419 A1 * | 8/2007 | Miller et al. .................. 370/338 |
| 2008/0194201 A1 * | 8/2008 | Sinivaara et al. ............ 455/41.2 |
| 2009/0310578 A1 * | 12/2009 | Convertino et al. .......... 370/338 |

FOREIGN PATENT DOCUMENTS

| | | |
|---|---|---|
| CN | 1234167 A | 11/1999 |
| EP | 1677456 | 7/2006 |
| JP | 2006101400 A | 4/2006 |
| JP | 2006197122 A | 7/2006 |
| TW | I245572 | 12/2005 |
| TW | I246260 | 12/2005 |
| TW | I246347 | 12/2005 |

OTHER PUBLICATIONS

International Search Report, PCT/US2007/077017—International Searching Authority—European Patent Office, May 9, 2008.

(Continued)

*Primary Examiner* — Chirag Shah
*Assistant Examiner* — Jay P Patel
(74) *Attorney, Agent, or Firm* — Abdollah Katbab

(57) ABSTRACT

A wireless terminal concurrently associates with multiple wireless local area networks. The wireless terminal may operate in power save mode on both of the WLANs to prevent a disruption of communication on either WLAN. The wireless terminal may adjust the times at which it listens for beacons to enable reception of beacon information even though the beacons for different WLANs may overlap in time. Beacon transmission times also may be scheduled to avoid overlapping transmissions of beacons on different WLANs.

73 Claims, 16 Drawing Sheets

OTHER PUBLICATIONS

Written Opinion, PCT/US2007/077017—International Searching Authority—European Patent Office, May 9, 2008.
European Search Report—EP09006267—Search Authority—Munich—Jul. 14, 2009.
European Search Report—EP09006269—Search Authority—Munich—Jul. 14, 2009.
Taiwan Search Report—TW0961312110—TIPO—Aug. 3, 2011.

* cited by examiner

US 8,223,662 B2

CONCURRENT OPERATION IN MULTIPLE WIRELESS LOCAL AREA NETWORKS

CLAIM OF PRIORITY UNDER 35 U.S.C. §119

This application claims the benefit of and priority to commonly owned U.S. Provisional Patent Application No. 60/841,105, filed Aug. 29, 2006, and assigned, the disclosure of which is hereby incorporated by reference herein.

BACKGROUND

Field

This application relates generally to wireless communication and more specifically, but not exclusively, to supporting concurrent operation in multiple wireless local area networks.

An electronic device may support one or more communication technologies to transmit information to and/or receive information from other electronic devices. For example, a wireless technology such as Wi-Fi (i.e., based on IEEE 802.11) facilitates communication over airwaves between two or more wireless devices. Two common types of Wi-Fi networks are infrastructure networks and ad hoc networks.

In general, an infrastructure wireless network enables wireless devices within the coverage area of the network to communicate with one another and, through an associated infrastructure, with other devices that are coupled to another network. For example, an 802.11-based access point may provide connectivity to enable a wireless terminal (e.g., station) to communicate via the access point with another network (e.g., a wide area network such as the Internet).

In contrast, an ad hoc wireless network generally enables communication between a set of wireless terminals that are within communication range of each other. In other words, an ad hoc network may be defined without a central coordinator such as an access point that provides connectivity to another network. In this case, functionality that would otherwise be provided by an access point (e.g., generating beacons and buffering traffic) may instead be implemented in and shared among all of the wireless terminals that form the ad hoc network.

SUMMARY

A summary of sample aspects of the disclosure follows. It should be understood that any reference to aspects herein may refer to one or more aspects of the disclosure.

The disclosure relates in some aspects to supporting concurrent operation in multiple wireless local area networks ("WLANs"). Here, various provisions may be made to prevent a disruption of communication on one of the WLANs that may otherwise occur when transferring data or performing some other operation on another one of the WLANs.

The disclosure relates in some aspects to a wireless terminal that associates with multiple WLANs and operates in power save mode on both of the WLANs to prevent a disruption of communication on either WLAN. In this way, in the event the wireless terminal is communicating on one of the WLANs, traffic on the other WLAN destined for the wireless terminal may be buffered for retrieval at a later time. The wireless terminal may thus control the transmission of traffic to the wireless terminal by simply polling for downlink traffic on a given WLAN whenever the wireless device is ready to receive traffic on that WLAN.

The disclosure relates in some aspects to a wireless terminal that is associated with multiple WLANs and is configured to adjust the times at which it listens for beacons in an attempt to receive beacon information even though the beacons for the different WLANs may be transmitted concurrently. For example, the wireless terminal may select a listen interval such that the wireless terminal listens for beacons from the different WLANs at different times. In addition, the wireless terminal may select the time at which it associates with a given WLAN to ensure that the beacon intervals for the different WLANs do not coincide in time.

The disclosure relates in some aspects to scheduling of beacon transmission times to avoid concurrent transmissions of beacons on different WLANs. For example, a wireless device that generates beacons for a first WLAN may determine the beacon transmission times of a second WLAN, then select beacon transmission times for the first WLAN that avoid overlap with the beacons of the second WLAN.

BRIEF DESCRIPTION OF THE DRAWINGS

Sample features, aspects and advantages of the disclosure will be described in the detailed description and appended claims that follow, and in the accompanying drawings, wherein:

FIG. 1, including

FIG. 3, including

Figure 1A:
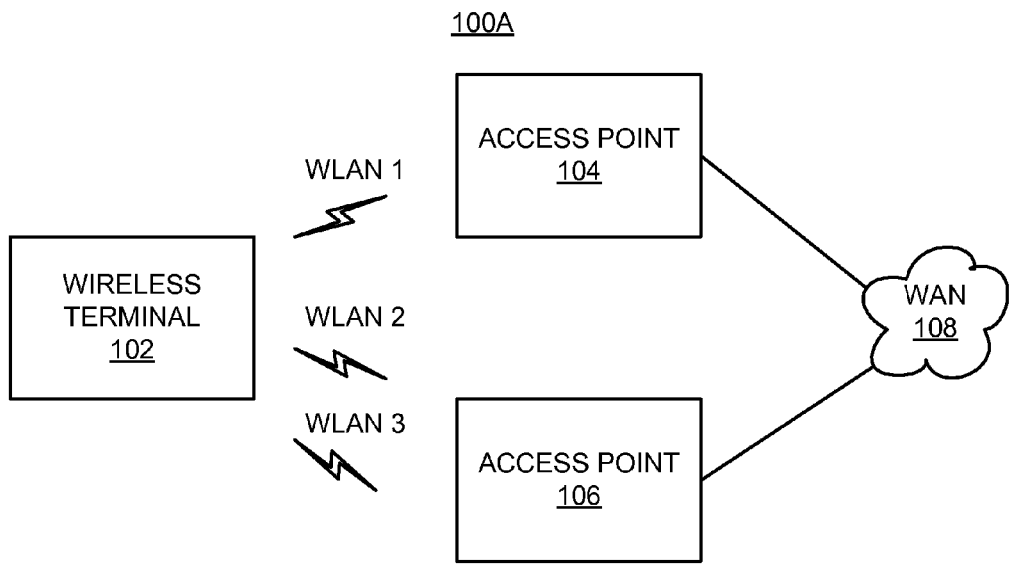
FIGS. 1A and 1B, depicts simplified block diagrams of several sample aspects of communication systems configured to support concurrent operation in multiple wireless networks.

In accordance with common practice the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

FIG. 1 illustrates sample aspects of a pair of communication systems 100A and 100B where a wireless terminal 102 may concurrently communicate with two or more wireless networks. For example, in FIG. 1A the wireless terminal 102 may be associated with a first WLAN (WLAN 1) established by an access point 104 and also may be associated with a second WLAN (WLAN 2) established by an access point 106. In addition, the wireless terminal 102 may be associated with both WLANs (WLANs 2 and 3) established by the access point 106. In the example of FIG. 1A, all of the WLANs are infrastructure WLANs in that the access points 104 and 106 provide connectivity to a wide area network 108 (e.g., the Internet).

Figure 1B:
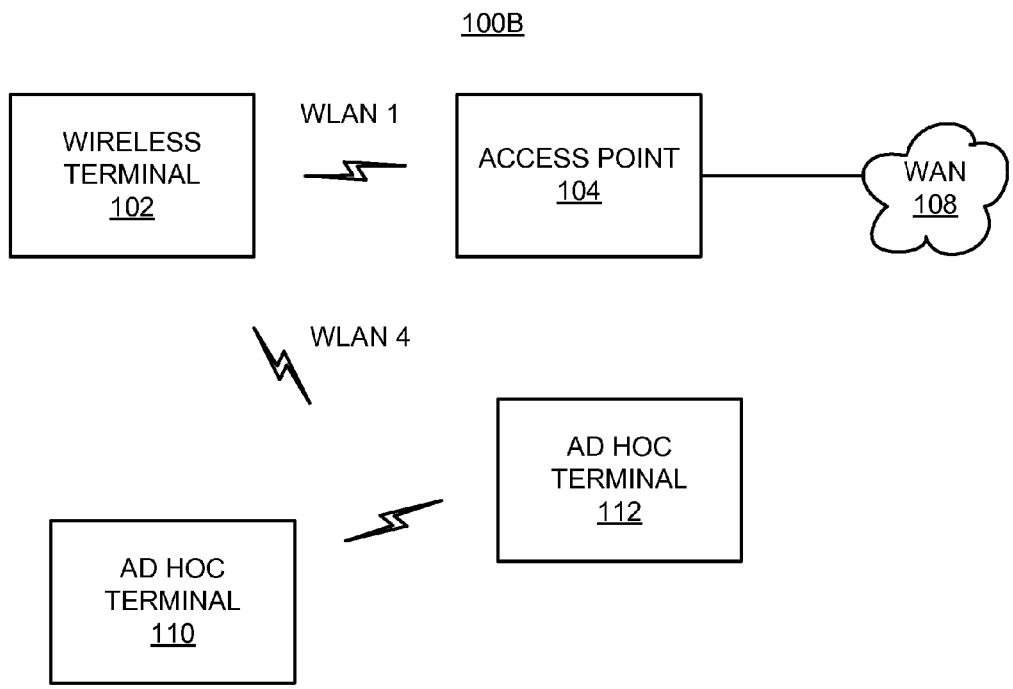

FIG. 1B illustrates that the wireless terminal 102 also may be concurrently associated with an ad hoc wireless network (e.g., WLAN 4) and one or more other wireless networks. For example, the wireless terminal 102 may join an ad hoc wireless network (WLAN 4) established by one or more other wireless terminals (e.g., wireless terminals 110 and 112), or may establish its own ad hoc wireless network. The one or more other wireless networks mentioned above may comprise an infrastructure wireless network (e.g., WLAN 1), another ad hoc wireless network (not shown in FIG. 1), or some other type of wireless network.

The discussion that follows will, in general, described various implementations involving concurrent operation in multiple WLANs. It should be appreciated, however, that the teachings herein also may be applicable to other types of operations and other types of communication networks.

In accordance with some aspects of the disclosure, the wireless terminal 102 may concurrently associate with different WLANs to enable different types of data to be transmitted or received over different wireless channels. For example, real-time traffic such as voice and video may be transmitted and received over one WLAN while best-effort traffic such as web browsing and e-mail may be transmitted and received over another WLAN.

Such a division of traffic over different WLANs may provide one or more advantages in certain situations. For example, a wireless device may be able to operate more efficiently or may be able to transfer data at a higher overall rate by transferring different data on different wireless channels. Also, simultaneous operation on multiple WLANs may be employed, for example, in subscription management or transport management applications.

In some aspects, division of traffic may enable different types of traffic to be routed over channels that are better suited to handle the different types of traffic. For example, real-time traffic may be deployed in the 5 GHz UNI wireless band while best-effort traffic may be deployed in the 2.4 GHz ISM wireless band. Here, the 2.4 GHz ISM band may be relatively crowded and may, as a result, suffer from interference. Consequently, a WLAN operating in such a 2.4 GHz band may lack the necessary bandwidth and quality of service to support real-time traffic. In contrast, such a WLAN may adequately support data transmissions such as best effort traffic that do not have as strict of quality of service requirements.

Division of traffic also may enable a communication carrier to better manage subscriptions for subscribers that use the different types of traffic. For example, a WLAN designated to carry real-time traffic may have a different service set identifier ("SSID") than a WLAN designated to carry best effort traffic. Consequently, different authentication credentials may be required to access the services provided by the different WLANs. This, in turn, may enable a carrier to more appropriately bill subscribers that are accessing the different types of traffic.

Division of traffic between infrastructure and ad hoc WLANs also may provide one or more advantages in certain situations. For example, a user may connect to the infrastructure WLAN to access the Internet or an enterprise intranet. At the same time, the user may wish to participate in an ad hoc WLAN where the users participating in the ad hoc WLAN may not have all the necessary credentials to connect to the infrastructure WLAN and communicate via the associated access point.

Additionally, with the advent of 802.11n, WLAN chipsets may be a common feature in consumer electronic devices such as set-top boxes, game consoles, display devices such as HDTV, and so on. Consumer electronic devices such as these may, under some circumstances, either join an infrastructure WLAN or form their own ad hoc WLAN. Consequently, applications running on a wireless terminal may be capable of joining an infrastructure WLAN and one or more ad hoc WLANs formed by the consumer devices. For example, an application such as HDTV that has a relatively high bandwidth requirement may be better served by an ad-hoc WLAN since the ad hoc WLAN may provide a one-hop route as compared to a two-hop route offered by an infrastructure WLAN.

Concurrent use of multiple WLANs may provide one or more advantages for terminals participating in ad hoc networks. For example, in an ad hoc network a mesh point may concurrently participate in several WLANs. Consequently, the mesh point may provide connectivity across these WLANs for the ad hoc terminals.

Concurrent WLANs may be configured in a variety of ways. For example, in some implementations each WLAN may have a unique service set identifier. Alternatively, in other implementations two or more WLANs may be associated with the same service set identifier. In the latter case, a given WLAN may be identified by, for example, a media access control ("MAC") address of an access point that established the WLAN.

In addition, in some aspects the different WLANs may be established on different wireless channels. In various implementations these different channels may be associated with either the same wireless band or different wireless bands.

Figure 2:
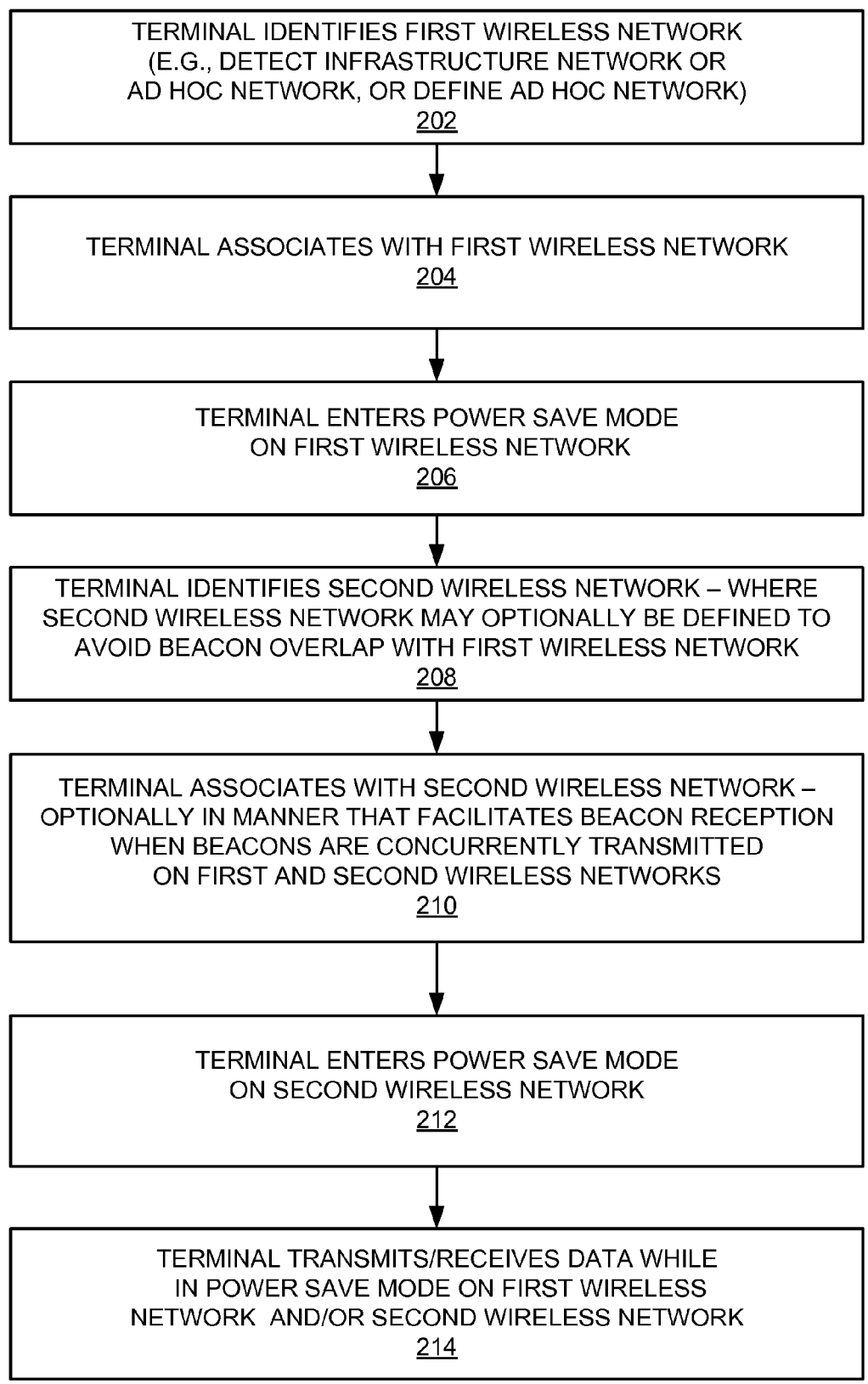
FIG. 2 is a flowchart of several sample aspects of operations that may be performed to support concurrent operation in multiple wireless networks.

An overview of sample operations relating to concurrent operation in multiple WLANs will now be provided in the context of the flowchart of FIG. 2. For convenience, the operations of FIG. 2 (or any other operations discussed or taught herein) may be described as being performed by specific components (e.g., components of the systems 100A and 100B). It should be appreciated, however, that these operations may be performed by other types of components and may be performed using a different number of components. It also should be appreciated that one or more of the operations described herein may not be employed in a given implementation.

As represented by block 202 in FIG. 2, the wireless terminal 102 identifies a first wireless network with which it may establish wireless communication. As mentioned above, this operation may involve detecting an infrastructure WLAN or an ad hoc WLAN, or this operation may involve defining an ad hoc WLAN. Upon identification of an appropriate WLAN, the wireless terminal associates with the identified WLAN (e.g., WLAN 1) on the designated wireless channel (block 204).

At block 206, the wireless device enters power save mode on the first WLAN. Consequently, any wireless device (e.g., access point 104) on the first WLAN that has data to transmit to the wireless terminal 102 will buffer the data for transmission at a later time. In conjunction with this power save mode, the wireless terminal 102 may monitor the associated wireless channel for any beacons that include an indication that another wireless device on the WLAN has buffered data for transmission to the wireless terminal 102.

At block 208, the wireless terminal 102 identifies a second wireless network with which it may establish wireless communication. Again, this may involve detecting an infrastructure WLAN or an ad hoc WLAN, or defining an ad hoc WLAN.

At block 210, the wireless terminal 102 associates with the identified WLAN (e.g., WLAN 2) on the designated wireless channel. Here, simultaneous participation in two WLANS may result in assignment of two IP addresses to the wireless terminal 102. The TCP/IP stack in the wireless terminal 102 may thus support the use of multiple interfaces.

It should be appreciated that concurrent operations in multiple WLANs could potentially result in disruptions in communication on one WLAN any time the wireless terminal 102 is actively communicating on another WLAN. For example, when the wireless terminal 102 is transmitting it may not be able to receive data from any other wireless device. Consequently, any attempts to communicate with the wireless terminal 102 under these circumstances will result in unsuccessful transmissions. These unsuccessful transmissions may, in turn, increase congestion on the corresponding WLAN, thereby reducing the overall throughput of the WLAN. Moreover, if data transmissions to the wireless terminal 102 over a given WLAN are repeatedly unsuccessful, an assumption may be made the wireless terminal 102 has left the WLAN and the wireless terminal 102 may be prematurely disconnected from the WLAN.

In implementations where the WLANs are established on the same wireless channel, 802.11 MAC procedures may ensure collision free operation among the WLANs. For example, prior to transmission of a beacon, an access point may follow the CSMA/CA procedure thereby ensuring that the access point will not transmit its beacon at the same time another access point transmits its beacon.

In contrast, in implementations where the second WLAN is established on a different wireless channel than the first WLAN, one or more of the techniques taught herein may be employed to facilitate reliable data transmission on each of the WLANs. For example, in some implementations the first and second wireless networks may be defined to avoid overlapping beacon transmission times. Here, as will be discussed in more detail below conjunction with FIGS. 7, 9, and 10, there may be some form of coordination among two or more components of the first and second WLANs to schedule beacon transmissions at different times on the WLANs.

In addition, in some implementations a wireless terminal may associate with one or more WLANs in a manner that facilitates receiving beacon information even when the beacons for the different WLANs are concurrently transmitted. For example, as discussed below conjunction with FIGS. 3 and 5, a wireless terminal may select a beacon interval or select a time to associate with a given WLAN in a manner that enables the wireless terminal to receive the appropriate beacons associated with the different WLANs at different times.

At block 212, the wireless terminal 102 enters power save mode on the second WLAN. Thus, any wireless device (e.g., access point 106) on the second WLAN that has data to transmit to the wireless terminal 102 will buffer the data for transmission at a later time. Again, the wireless terminal 102 may then monitor the associated wireless channel for any beacons that include an indication that another wireless device on the second WLAN has buffered data for transmission to the wireless terminal 102.

As represented by block 214, the wireless terminal 102 may remain in power save mode on one or both of the WLANs when it transmits or receives data via one of these WLANs. In other words, the state of the wireless terminal 102 as it is known to other devices on a given WLAN will be a power save state. However, the wireless terminal 102 may remain fully functional or substantially fully functional (e.g., not powered-down) during all or a portion of this time. For example, the wireless terminal 102 may be powered-down to some extent most of the time. Then, when the wireless terminal 102 needs to transmit a polling message, scan for beacons, transmit data, or receive data, the wireless terminal may power on the required circuitry. However, even when these components are powered-on, the wireless terminal 102 may remain in the power save mode with respect to any associated WLANs. In this way, the wireless terminal 102 may transmit or receive data on one of the WLANs, yet any potential downlink traffic on another WLAN will be buffered for subsequent transmission since the devices on that WLAN will assume the wireless terminal 102 is not active and, hence, cannot receive the traffic.

To summarize briefly, when the wireless terminal is idle, it may monitor all of its associated WLANS. In addition, the wireless terminal may at some point switch to an active mode where it may elect to operate on only one WLAN at a time or it may attempt to support simultaneous operation on every WLAN. These and other related operations will be treated in more detail in conjunction with FIGS. 3 and 6.

Figure 3A:
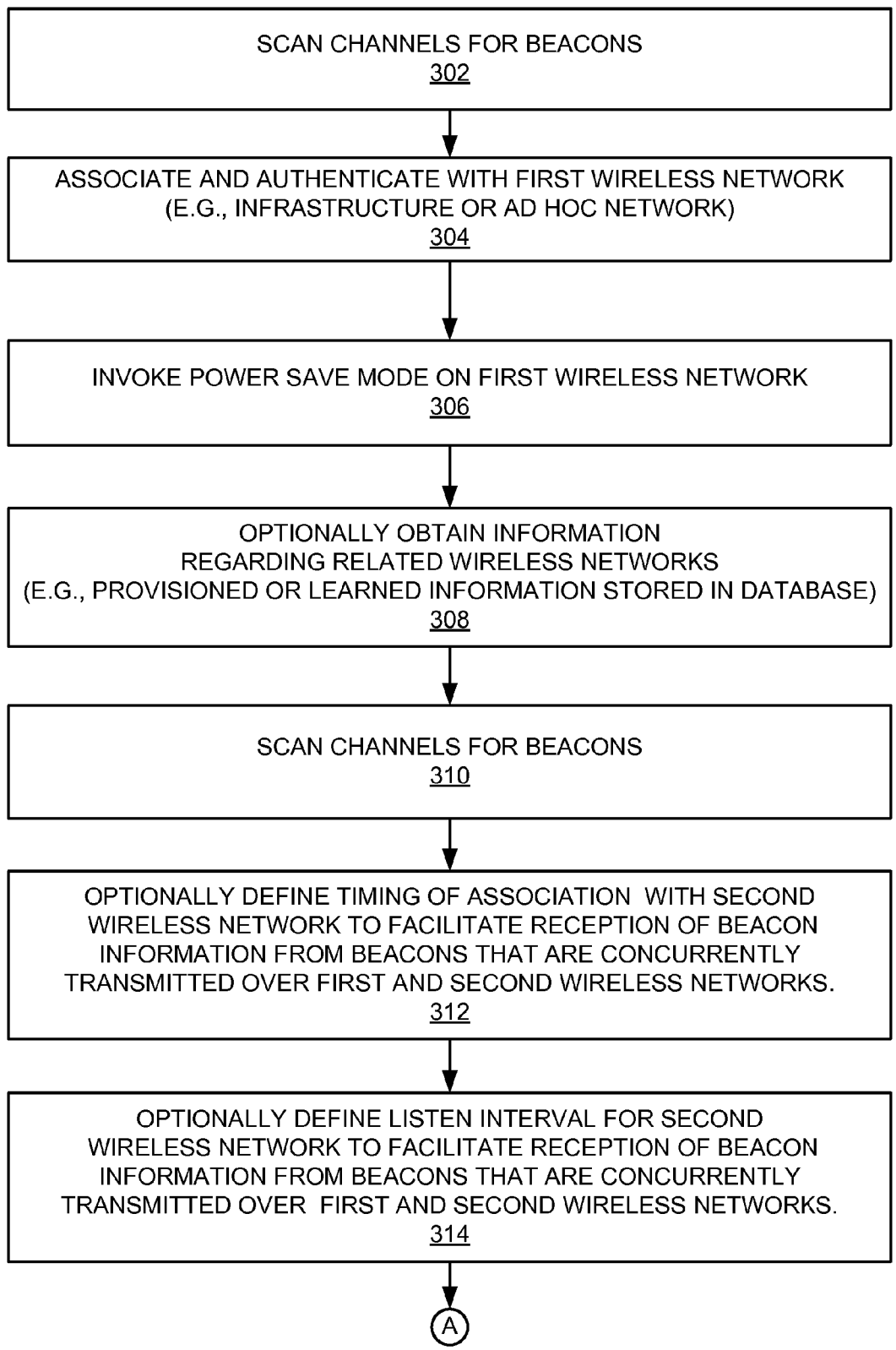
FIGS. 3A and 3B, is a flowchart of several sample aspects of operations that may be performed by a wireless terminal to support concurrent operation in multiple wireless networks.
Figure 3B:
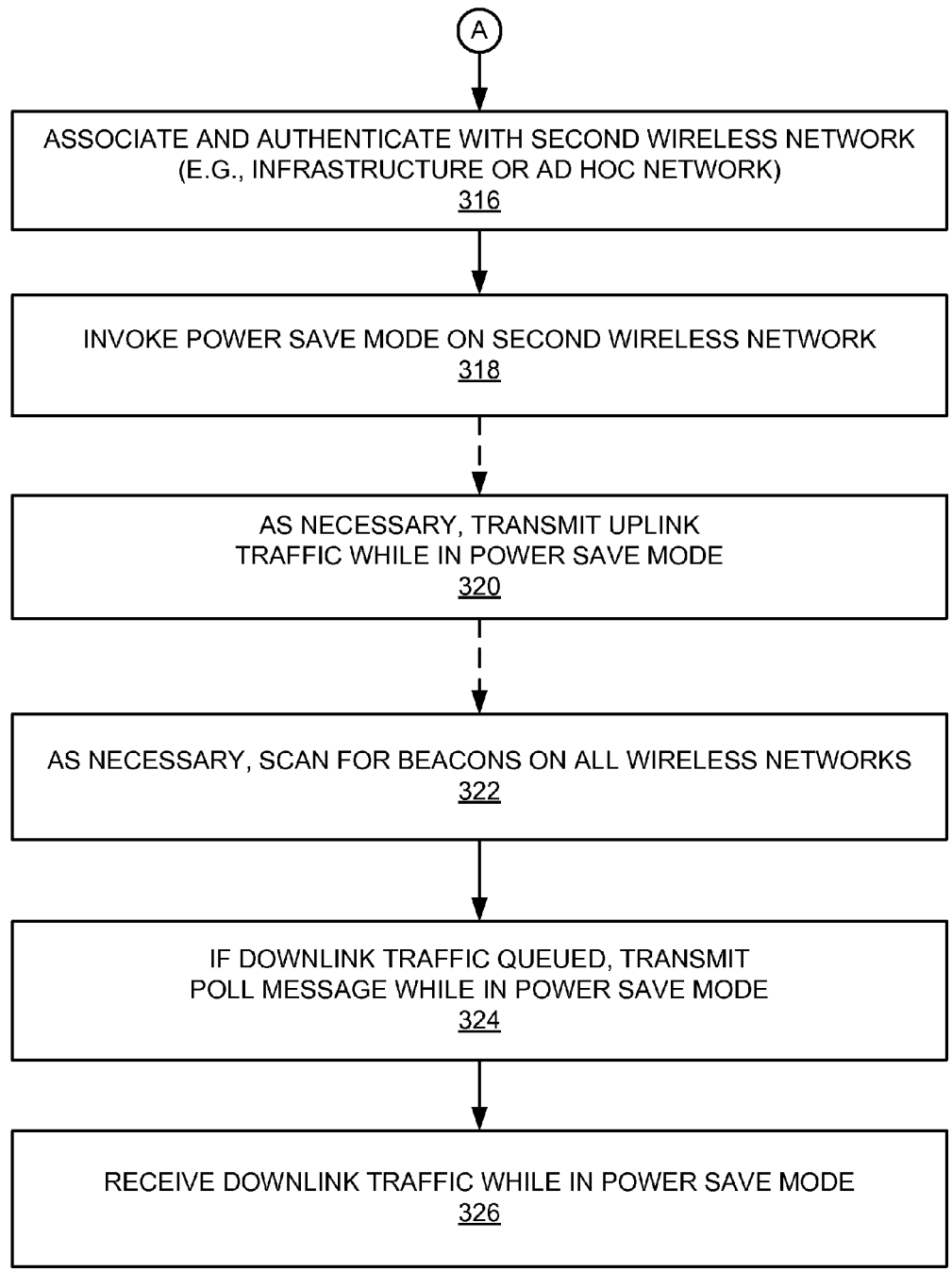
Figure 4:
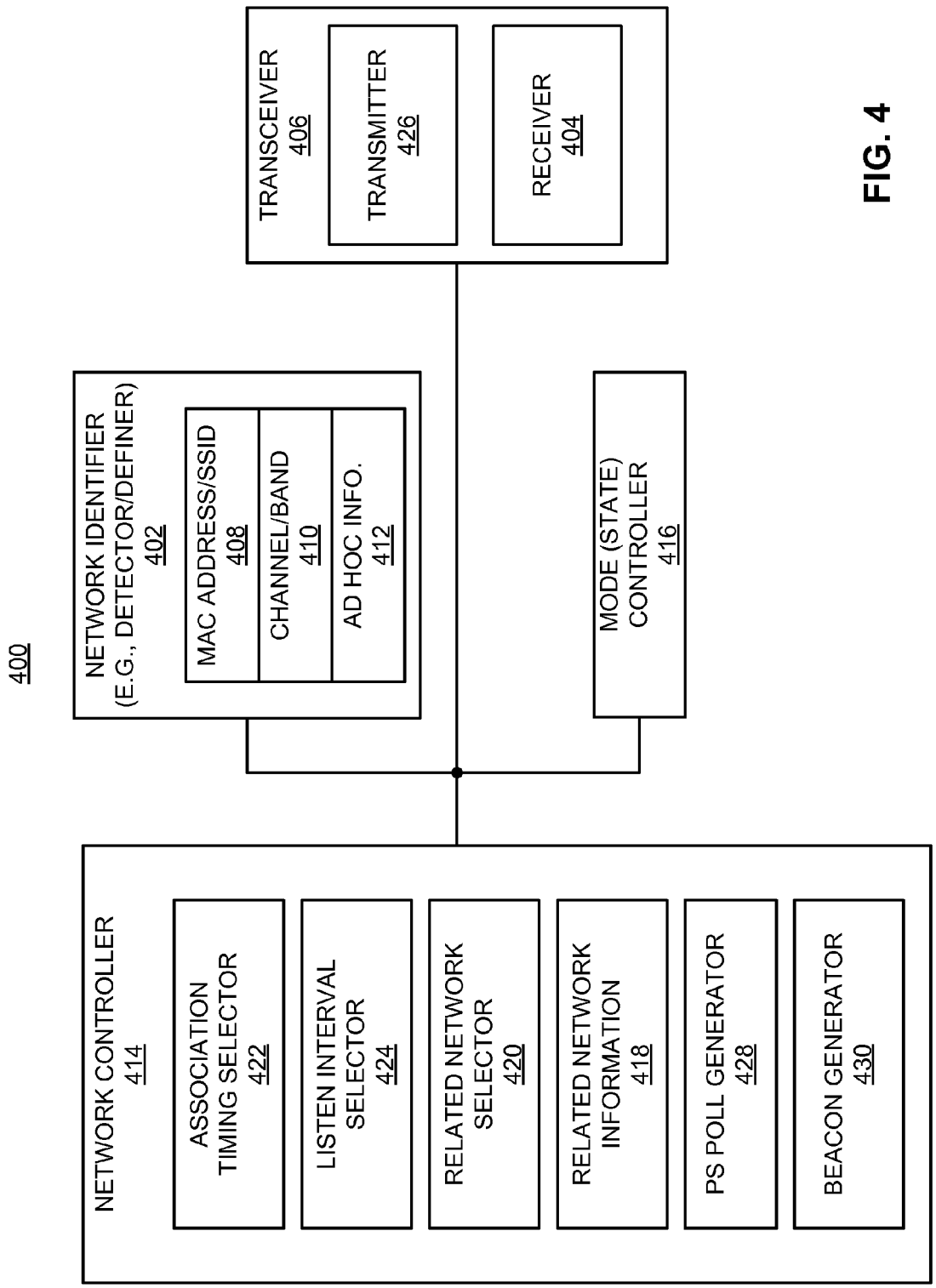
FIG. 4 is a simplified block diagram of several sample aspects of a wireless terminal.
Figure 5:
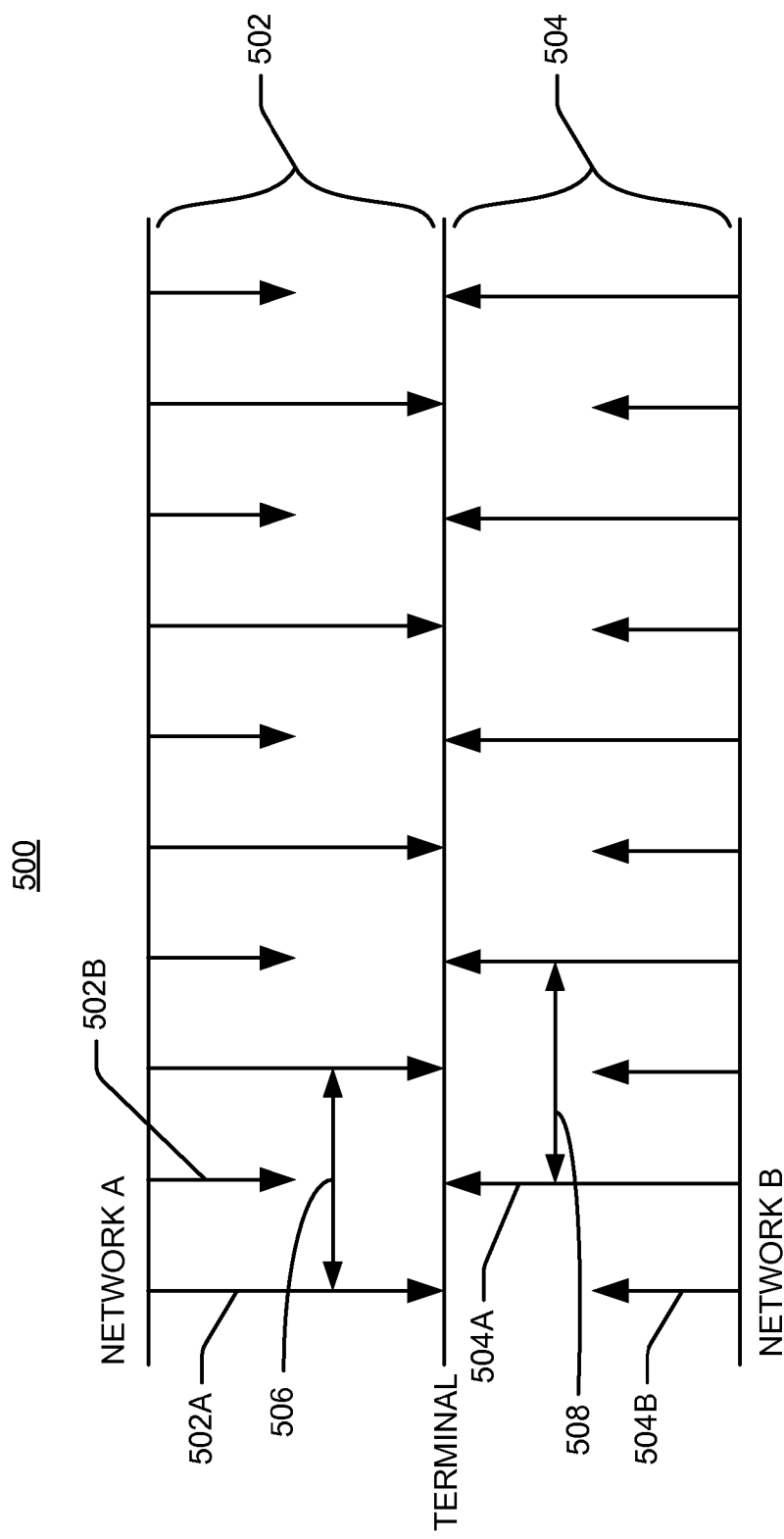
FIG. 5 is a simplified timing diagram of sample beacon transmission times for a pair of wireless networks.
Figure 6:
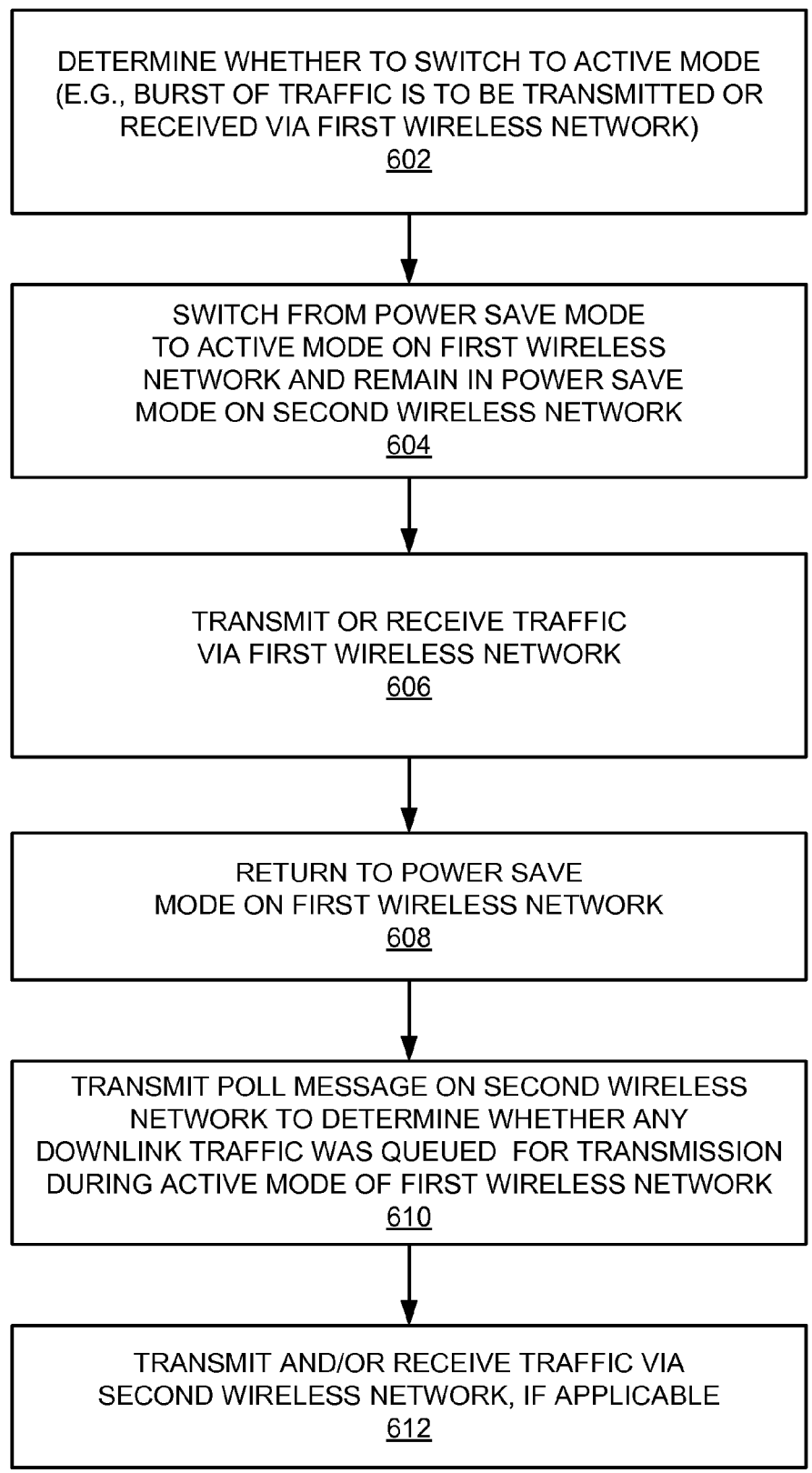
FIG. 6 is a flowchart of several sample aspects of operations that may be performed by a wireless terminal to transfer data in an active mode of operation.

In general, FIGS. 3-6 relate to a wireless terminal or some other type of wireless device that may concurrently associate with multiple WLANs. For convenience, such a device will be referred to in the discussion that follows simply as a "wireless terminal." Briefly, FIG. 3 relates to operations that may be performed by a wireless terminal to concurrently operate in multiple WLANs. FIG. 4 depicts sample functional blocks of a wireless terminal. FIG. 5 illustrates sample beacon timing for multiple WLANs. FIG. 6 illustrates sample operations that a wireless terminal may perform in conjunction with the transmission or reception of data in an active operational mode.

In practice, a wireless terminal interacts with an existing WLAN in three basic modes of operation. Initially, the wireless terminal enters a search mode to search for a suitable WLAN. Once the wireless terminal is associated with a WLAN, the wireless terminal may then switch between idle and active modes of operation.

For illustration purposes, the operations of FIGS. 3 and 6 will be discussed in the context of being performed by various components of a wireless terminal 400 as shown in FIG. 4. It should be appreciated, however, that the illustrated components of the wireless terminal 400 are merely representative of components that may be employed here and that one or more of the operations of FIG. 3 may be performed by or in conjunction with other suitable components.

As represented by block 302 of FIG. 3, a network identifier 402 (e.g., a network detector), in cooperation with a receiver component 404 of a transceiver 406, scans a set of wireless channels to determine whether there are any WLANs operating in the vicinity. This operation may involve, for example, acquiring any beacons that may have been transmitted by an access point of an infrastructure WLAN or one or more wireless terminals associated with an ad hoc WLAN.

In some implementations the wireless terminal 400 may search all the channels in all the supported bands as specified by a search and system selection algorithm. Additionally, as discussed below, an association between overlapping WLANs may be stored in a database.

In the event beacons or other similar network signals are detected at block 302, the network identifier 402 may extract network related information from the signals and store this information in an appropriate data memory. For example, the network identifier 402 may maintain information 408 relating to a service set identifier of a given WLAN and, if applicable, the MAC address of an access point that establish the WLAN. In addition, the network identifier 402 may maintain information 410 that identifies the channel and band designated for the WLAN. Also, in the event the detected WLAN is an ad hoc network, the network identifier 402 may maintain information 412 relating to the ad hoc network (e.g., relating to any associated wireless terminals).

As represented by block 304 of FIG. 3, a network controller 414 may then associate and authenticate with one or more of the identified WLANs and commence idle mode operation on each WLAN. For convenience, the discussion that follows will simply referred to a first WLAN with which the wireless terminal 400 has associated.

At block 306 a mode controller 416 may switch the wireless terminal 400 to power save mode on the first WLAN (e.g., immediately upon commencement of idle mode operation). As a result, any wireless device (e.g., an infrastructure access point or an ad hoc terminal) that has data to be downloaded to the wireless terminal 400 may buffer the data for transmission at a later time.

As discussed in more detail below, during idle mode the wireless terminal 400 may wake up regularly at a negotiated listen interval and, upon detection of traffic activity, switch to an active mode of operation. In addition, when the wireless terminal 400 is camping on one WLAN, the wireless terminal 400 may keep searching for other WLANs of interest on all of the available channels.

As represented by block 308, at some point in time (e.g., prior to the operations illustrated in FIG. 3) the wireless terminal 400 may obtain information 418 relating to one or more sets of related WLANs. The information 418 may indicate, for example, that two or more WLANs (e.g., corresponding to unique service set identifiers) have overlapping coverage areas or are adapted in some other manner that facilitates concurrent operation over these WLANs. As an example, a pair of WLANs may be defined to support splitting of traffic flows wherein one of the WLANs is better suited to handle one type of traffic and the other WLAN is better suited to handle another type of traffic. The information 418 may describe various attributes of each WLAN including, for example, service set identifiers and the MAC address of an access point. In some implementations the wireless terminal 400 may identify the presence of a mobility domain (e.g., as found in enterprise implementations or as defined in 802.11r) and may not attempt to dual-register on two identical service set identifiers of the same mobility domain.

The information 418 may be acquired in various ways. For example, in some implementations the information 418 may be downloaded to the wireless terminal 400 when it is provisioned by a communication carrier (e.g., initially placed in service). Also, the wireless terminal 400 may acquire the information 418 from time to time depending on, for example, the location of the wireless terminal 400 and whether any WLANs have recently been established. In some aspects association of two or more WLANs may be learned after first discovery of overlapping coverage of the WLANs. Corresponding information 418 may then be stored locally for later use.

As represented by block 310 in FIG. 3, at some point in time the wireless terminal 400 may elect to associate with another WLAN (e.g., on a different channel). In some implementations, the selection of the WLANs for concurrent operation is based on the related network information 418. In such a case, a related network selector component 420 may cause the network identifier 402 to specifically scan for a designated set of WLANs. Alternatively, the network identifier 402 may simply scan for any available WLANs.

As will be discussed in more detail in conjunction with FIG. 7 below, in some implementations beacon transmissions are synchronized between WLANs that have common coverage areas (e.g., via some form of coordination between a component of each WLAN). Here, at least one the WLANs may be defined such that its beacons and the beacons of the other WLANs are not transmitted concurrently. In such cases, the wireless terminal 400 may readily associate with these WLANs without taking any steps to compensate for any potential overlap of beacons.

In contrast, in implementations where the beacon-sending devices (e.g., access points) of the WLANs are not synchronized with each other (e.g., when beacon transmission times of the WLANs are not coordinated), the wireless terminal 400 may optionally perform one or more operations in an attempt to ensure that it will be able to receive beacon information for each of the WLANs. For example, as represented by block 312 an association timing selector 422 may determine an appropriate time to associate with a given WLAN based on the beacon intervals of that WLAN and another WLAN that has concurrent (e.g., overlapping) beacon transmission times. Also, as represented by block 314 a listen interval selector 424 may select a listen interval for a given WLAN that facilitates reception of beacons from that WLAN and another WLAN that has overlapping beacon transmission times. The operations of blocks 312 and 314 may be better understood by reference to FIG. 5.

FIG. 5 illustrates a timing diagram 500 where a set of beacons associated with a first WLAN (designated network A in FIG. 5) is designated by arrows 502 and a set of beacons associated with a second WLAN (designated network B) is designated by arrows 504. As represented by the centerline in FIG. 5, a wireless terminal receives the beacons 502 and the beacons 504 from the two WLANs.

Here, the relative alignment of the two sets of beacons 502 and 504 illustrates that these beacons may be concurrently transmitted (e.g., overlap). In other words, the beacon transmission times of the different WLANs occur at the same time or sufficiently close in time to one another whereby a wireless device does not have sufficient time to switch channels to receive the beacons on the two WLANs. Thus, in some aspects, concurrent transmission of beacons involves beacon transmissions that occur within a period of time is less than or equal to the amount of time it takes for the receiver 404 to switch from receiving beacons on one wireless channel to receiving beacons on a different wireless channel (and potentially a different frequency band). In the event the beacons for the different channels overlap in this way, an attempt by the wireless terminal to receive one of the beacons (e.g., beacon 502A) on one WLAN results in the wireless terminal not receiving a corresponding one of the beacons (e.g., beacon 504B) on the other WLAN.

However, through the use of appropriately defined listen intervals, the wireless terminal may instruct the beacon-sending devices (e.g., access points) that it will listen for its beacon information at intervals corresponding to an integer multiple of the beacon intervals of the WLANs. As an example, the longer arrows (e.g., arrow 502A and arrow 504B) represent beacons associated with a listen interval designated by the wireless terminal for each respective WLAN. Here, the same beacon interval (namely, a beacon interval of "2") has been defined for each WLAN as represented by the double-arrowed lines 506 and 508. In other words, the wireless device will only listen for beacon information every other beacon interval. It should be appreciated that the wireless device may designate longer beacon intervals for the WLANs.

As FIG. 5 illustrates, a wireless terminal may be able to offset its listening times for the different WLANs. In this case, even though the WLANs transmit their beacons at substantially the same time, the wireless terminal may always reliably receive its beacon information from each of the WLANs. That is, the wireless terminal will receive a beacon from the first WLAN at a point in time represented by the beacon 502A, then the wireless terminal will receive a beacon from the second WLAN at a point in time represented by the beacon 504A, and so on. Thus, the wireless terminal will ignore the beacons 502B and 504B that do not include information (e.g., an infrastructure traffic indication map or an ad hoc traffic indication map) for that wireless terminal.

In some implementations the offset listening times for the wireless terminal as represented by the longer arrows in FIG. 5 may be accomplished by selecting the time at which the wireless terminal associates with one of the WLANs. For example, an access point may specify that the listen interval for a given wireless terminal starts at the first beacon transmitted after that wireless terminal associates with the access point. Thus, assuming in FIG. 5 that the wireless terminal first associated with network A, the wireless terminal may specify the time at which it associates with network B (e.g., by delaying the association procedure) so that the time falls after a beacon it does not want to receive (e.g., beacon 504B) and falls a sufficient time before a beacon that does want to receive (e.g., beacon 504A). In this way, based on the time at which the wireless terminal associates with the WLAN, the access point may schedule the transmission of beacon information for the wireless terminal at the desired times (e.g. at beacon 504A).

Referring again to FIG. 3, the wireless terminal 400 may thus complete its association and authentication with the second WLAN at block 316. The mode controller 416 may thus switch the wireless terminal 400 to power save mode on the second WLAN at block 318.

As represented by block 320, at some point in time the wireless terminal 400 may have data that needs to be transmitted over one of the WLANs. In this case, the wireless device 400 may elect to remain in power save mode on both of the WLANs while a transmitter 426 of the transceiver 406 transmits the data. However, the network controller 414 and the transceiver 406 are not powered down at this time. Thus, while in power save mode, the network controller 414 may cooperate with the receiver 404 to scan the designated channel to determine whether the channel is currently being used by another wireless device. Then, once the channel is free, the network controller 414 may cooperate with the transmitter 426 to acquire the channel and transmit the designated data. Here, even though another wireless device (e.g., an access point) in the WLAN has been informed that the wireless terminal 400 is in power save mode, this wireless device may still receive any data that the wireless terminal 400 transmits to the wireless device.

As represented by block 322-326, at some point in time another wireless device (e.g., an access point) of one of the associated WLANs may have data that needs to be transmitted to the wireless terminal 400. Here, the wireless device may use a beacon to inform the wireless terminal 400 that there is data queued for transmission. For example, the wireless device may set an appropriate bit in a traffic indication map (e.g., TIM or ATIM) in a beacon that is transmitted in accordance with the listen interval of the wireless terminal 400.

As represented by block 322, the wireless terminal 400 may therefore scan for beacons at the appropriate times on each of its associated WLANs. Here, the wireless terminal 400 may remain in power save mode while it scans for beacons or it may switch to active mode to scan for beacons.

In some implementations where there are overlapping beacons on the WLANs, the wireless terminal may not be able to adapt its listen intervals as shown in FIG. 5. For example, some access points may not allow a listen interval that is larger than the beacon interval. In such a case, the wireless terminal 400 may alternately receive beacons for the different WLANs. Consequently, the wireless terminal 400 will miss some of the beacons for each WLAN. On such a miss, a power save ("PS") poll generator 428 may issue a gratuitous PS poll message to the appropriate wireless device (e.g., access point) of the corresponding WLAN. In this way, the wireless terminal 400 may determine whether the wireless device has any data queued for transmission to the wireless terminal 400. In the event there is data queued in either of the WLANs, the wireless terminal 400 may follow a procedure described below to retrieve the data.

In some scenarios the wireless terminal 400 may elect to prioritize which beacons it will scan for at block 322. For example, in some implementations beacons associated with a first WLAN (e.g., as defined by a service set identifier) may have higher priority than beacons associated with a second WLAN. In this case, the wireless terminal 400 may scan for beacons on the first WLAN rather than the second WLAN. Similarly, in the event the wireless terminal 400 expects data on a certain WLAN, the wireless terminal 400 may elect to scan for beacons on the channel associated with that WLAN rather than any other WLANs for a period of time.

In the event the wireless terminal 400 determines that there is downlink traffic queued for transmission, the PS poll generator 428 generates a PS poll message to inform the appropriate wireless device (e.g., access point) to commence transmission of the downlink traffic (block 324). In response to this message, a wireless device will transmit the data whenever the associated wireless channel is available.

Again, the wireless terminal 400 may elect to remain in power save mode on both of the WLANs while its receiver 404 receives the data (block 326). As above, the receiver 404 is not actually powered down during this power save mode. Also, even though the wireless device has been informed that the wireless terminal 400 is in power save mode, the wireless device may still transmit the data to the wireless terminal 400 in response to the poll message.

The use of power save mode to transmit uplink traffic and receive downlink traffic results in an increase in overhead for these communications due to the PS poll transmissions. Such overhead may cause additional delay when transmitting or receiving data. Moreover, this overhead may increase congestion on the associated WLANs, thereby reducing the overall bandwidth efficiency of the WLANs. Accordingly, as represented by FIG. 6 in some implementations the wireless terminal 400 may elect to temporarily switch to an active mode on a given WLAN to transmit or receive traffic on that WLAN.

As represented by block 602 in FIG. 6, at some point in time the wireless terminal 400 may determine whether to switch to active mode. For example, the wireless terminal 400 may switch to active mode when it determines that it has a relatively large burst of traffic to be transmitted or received via a one of its WLANs.

As represented by block 604, the state controller 416 may then switch from power save mode to active mode on that WLAN. However, to ensure that there are no unsolicited transmissions on any other associated WLANs, the mode controller 416 will maintain the power save mode on these other WLANs.

At block 606, when the wireless terminal 400 is in active mode on the designated WLAN it may transmit and receive traffic without any of the overhead associated with the PS poll procedure. For example, the wireless terminal 400 may transmit a set of data (e.g., a burst of data) as discussed above any time it acquires the channel (e.g., when the channel is not being used by other wireless devices). Alternatively, whenever another wireless device receives data destined for a wireless terminal 400, this wireless device may immediately transmit the corresponding set of data (e.g., a burst of data) to the wireless terminal 400 whenever the wireless device acquires the channel.

As represented by block 608, the state controller 416 may then switch back from active mode to power save mode on the WLAN (e.g., the first WLAN). Again, the mode controller 416 may continue to maintain any other WLANs (e.g., the second WLAN) in power save mode.

However, after the first WLAN exits power save mode, the PS poll generator 428 may transmit a poll message to determine whether any downlink traffic was queued for the second WLAN when the first WLAN was in the active mode (block 610). In the event there is data queued for transmission, the wireless device 400 may retrieve the data as discussed herein (block 612). Similarly, in the event the wireless terminal 400 buffered any data for transmission over the second WLAN when the first WLAN was in the active mode, the wireless terminal 400 may transmit the data at block 612. Again, the wireless terminal 400 may remain in power save mode on all of its associated WLANs during these transmissions or receptions as taught herein.

Figure 7:
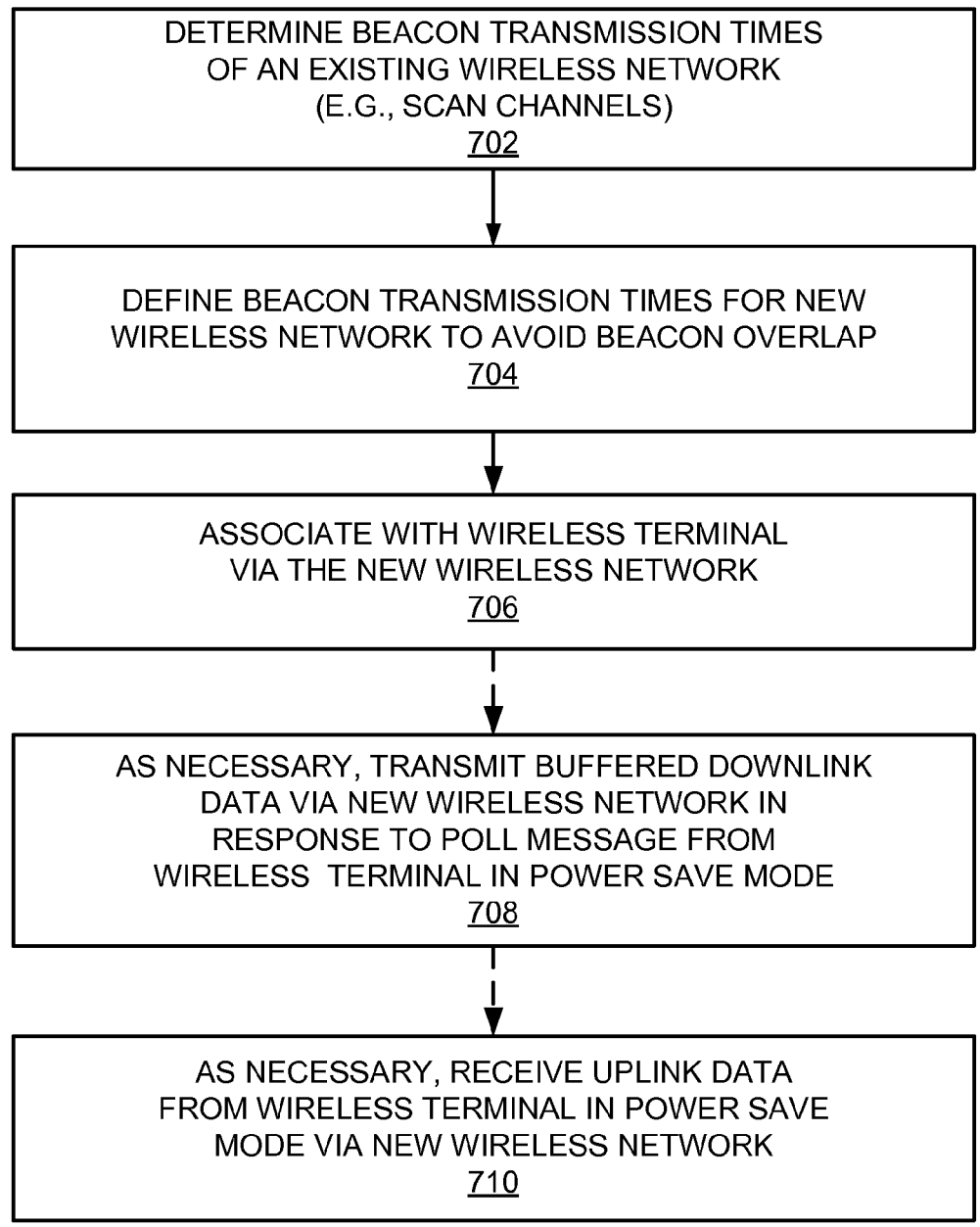
FIG. 7 is a flowchart of several sample aspects of operations that may be performed by a wireless device such as an access point for an infrastructure network or a wireless terminal for an ad hoc network to support concurrent operation in multiple wireless networks.
Figure 8:
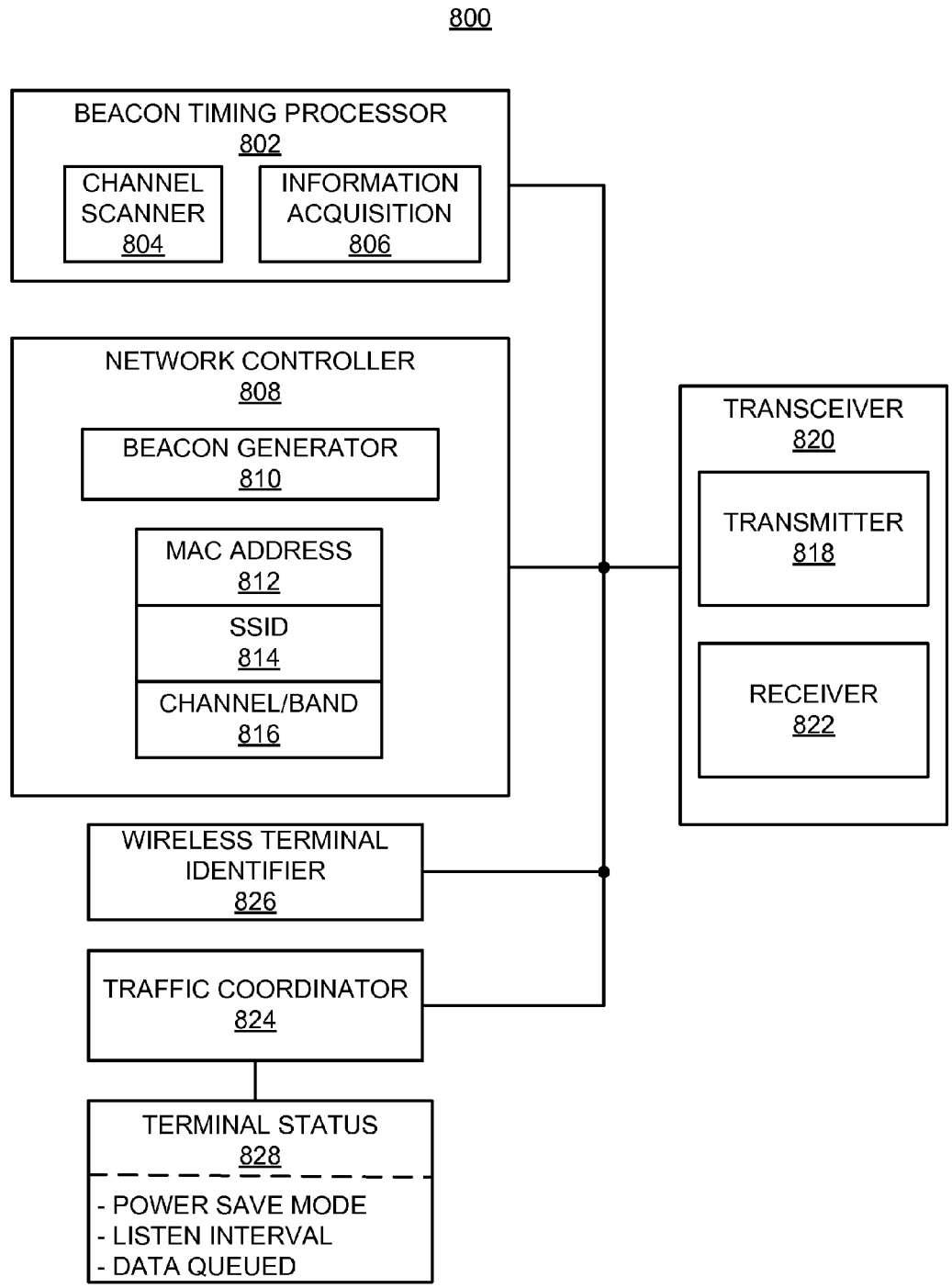
FIG. 8 is a simplified block diagram of several sample aspects of a wireless device such as an access point for an infrastructure network or a wireless terminal for an ad hoc network.
Figure 9:
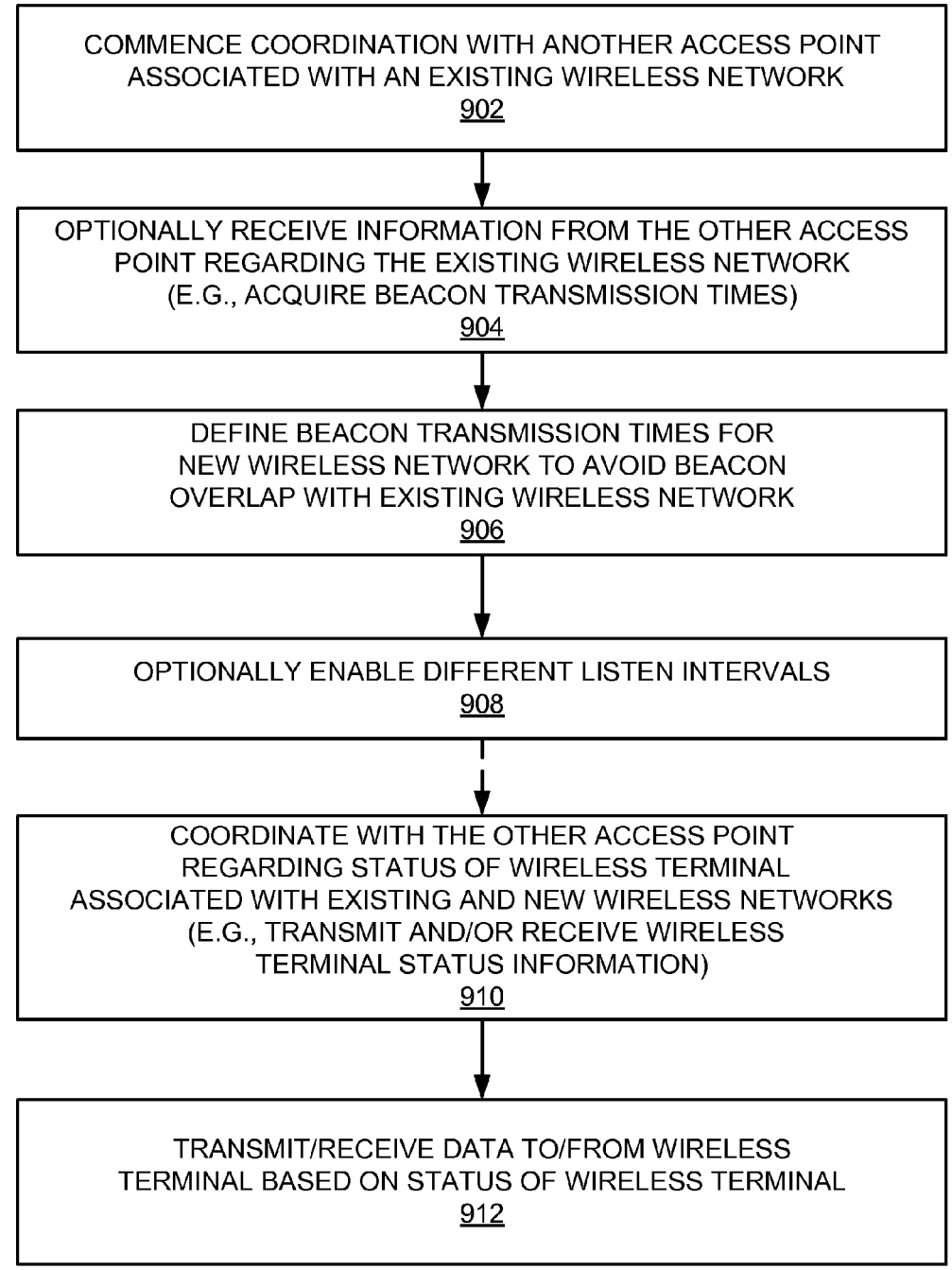
FIG. 9 is a flowchart of several sample aspects of operations that may be performed to coordinate the transfer of data in conjunction with concurrent operation in multiple wireless networks.
Figure 10:
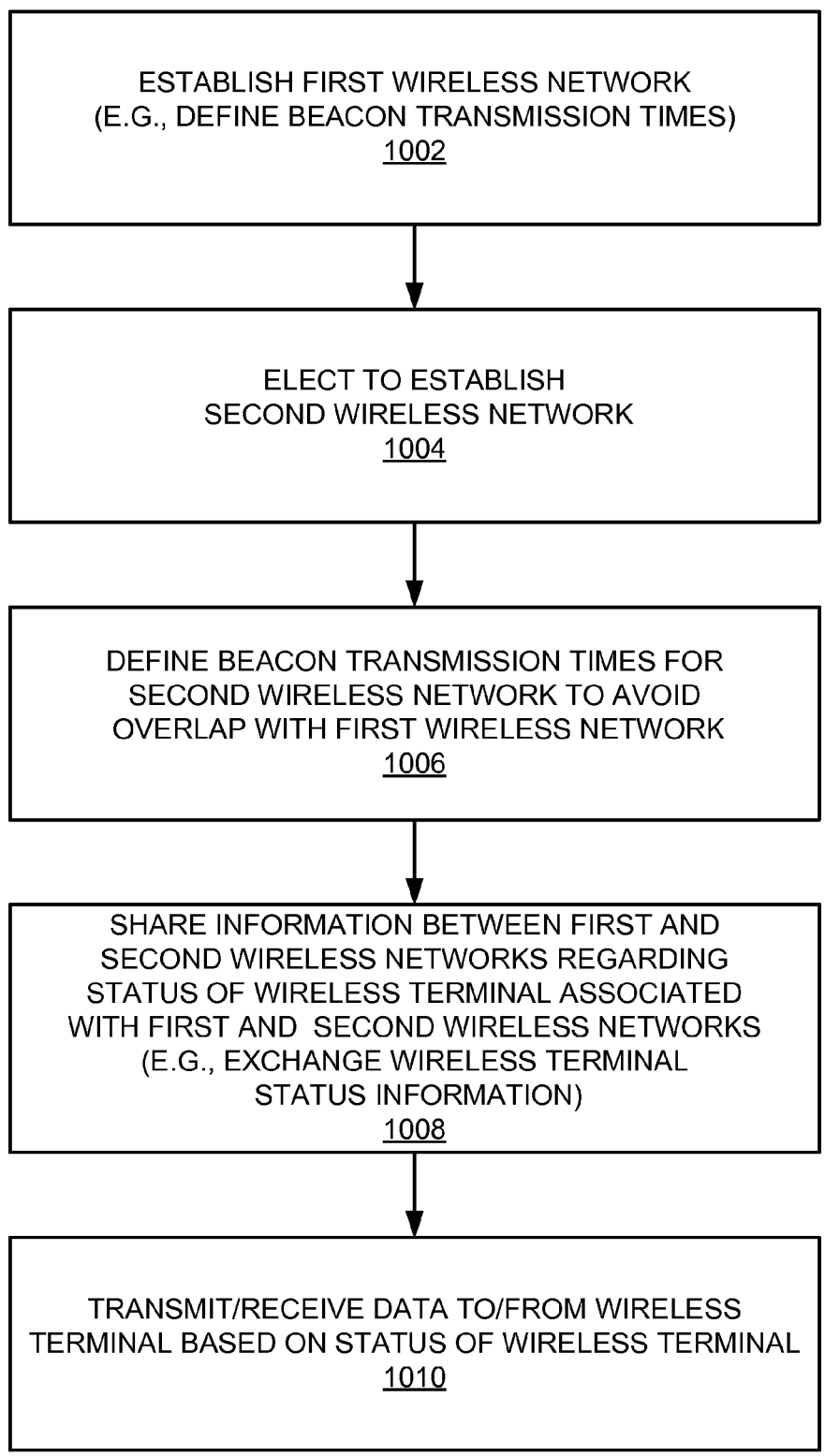
FIG. 10 is a flowchart of several sample aspects of operations that may be performed to support concurrent operation in multiple wireless networks that were established by a given wireless device.
Figure 11:
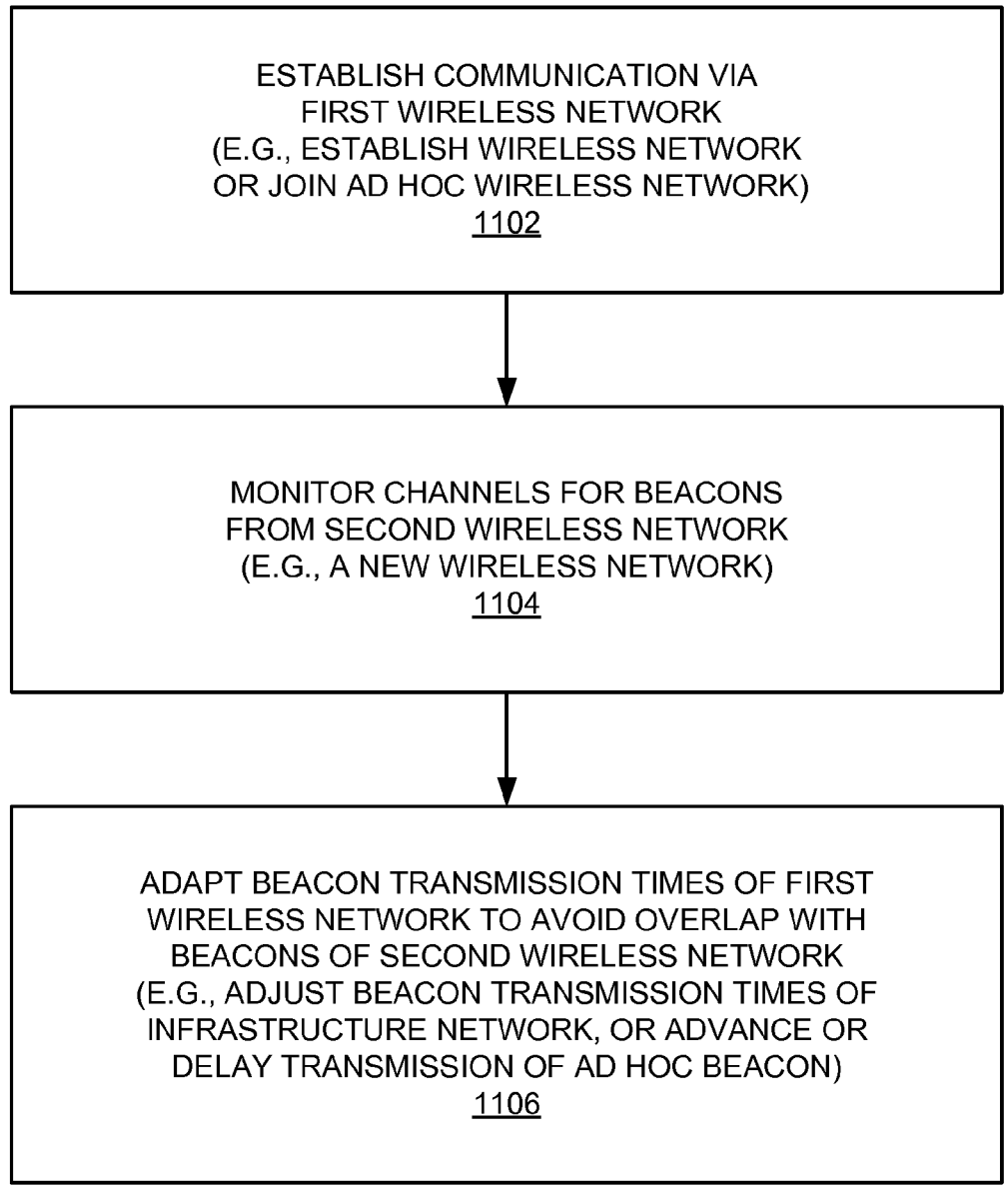
FIG. 11 is a flowchart of several sample aspects of operations that may be performed to adjust beacon transmission times in conjunction with concurrent operation in multiple wireless networks.

Referring now to FIGS. 7-11, these figures relate, in general, to a wireless device that generates beacons for a WLAN. Such a device may comprise, in some instances, an access point for an infrastructure WLAN or a wireless terminal for an ad hoc WLAN. For convenience, such a device may be referred to in the discussion that follows simply as a "wireless device." Briefly, FIG. 7 relates to operations that may be performed by a wireless device to define beacon transmission times and to communicate with a wireless terminal that is operating in power save mode. FIG. 8 depicts sample functional blocks of a wireless device 800. FIG. 9 illustrates sample operations that may be performed by a wireless device to coordinate with an access point. FIG. 10 illustrates sample operations that may be performed by a wireless device that establishes multiple WLANs. FIG. 11 illustrates sample operations that may be performed by a wireless device to adapt beacon transmission times.

For illustration purposes, the operations of FIGS. 7 and 9-11 will be discussed in the context of being performed by various components of the wireless device 800 (e.g., an access point) as shown in FIG. 8. Again, it should be appreciated that the referenced components are merely representative and that the operations of these figures may be performed by or in conjunction with other suitable components.

As represented by block 702 of FIG. 7, a beacon timing processor 802 determines the beacon transmission times of one or more existing WLANs. In some aspects this operation may be performed during initialization upon power-up or at some other time. In some implementations the beacon timing processor 802 may comprise a channel scanner 804 that is configured to monitor a set of wireless channels (e.g., on a periodic basis). In other implementations beacon timing information of an existing WLAN may be acquired using other techniques as described below conjunction with FIGS. 9 and 10.

At block 704 a network controller 808 (e.g., a beacon generator component 810) defines beacon transmission times for a new WLAN to be established by the wireless device 800. Here, the beacon transmission times may be defined according to a beacon start time and a beacon interval. In accordance with some aspects of the disclosure, the beacon generator 810 may define these beacon transmission times based on the beacon transmission times acquired at block 702. In this way, the beacons for the respective WLANs may be defined such that they do not overlap in time. In particular, non-overlapping beacons may be specified for any WLANs that may be concurrently used by a given wireless terminal. The network controller 808 then establishes the new WLAN associated with a MAC address 812 of the wireless device 800, a service set identifier 814, and information 816 relating to a specified wireless channel and wireless band.

At block 706, at some point in time the wireless device 800 may associate with a wireless terminal that joins the new WLAN. As mentioned above, the wireless terminal may enter power save mode after associating with the new WLAN.

As necessary, the wireless device 800 buffers data that it receives (e.g., via another network such as the Internet) that is destined for the wireless terminal. At the appropriate interval (e.g., the beacon interval or the listen interval) the beacon generator 810 generates a beacon that indicates whether there is buffered data for the wireless terminal. The network controller 808 then cooperates with a transmitter 818 of a transceiver 820 to transmit the beacon over the new WLAN.

As represented by block 708, at some point in time a receiver 822 of the wireless device 800 may receive a poll message from the wireless terminal (e.g., when the wireless terminal is in power save mode). As discussed herein, the wireless terminal may have transmitted this poll message in response to a bit being set in a traffic indication map of a beacon. Alternatively, the wireless terminal may transmit this poll message (e.g., a gratuitous poll) to determine whether data was queued for the new WLAN while the wireless terminal was performing some operation on another WLAN (e.g., while an active mode on the other WLAN).

In any event, the network controller 808, in cooperation with the transmitter 818, transmits the buffer downlink data to the wireless terminal via the new WLAN. As mentioned above, the wireless terminal may be in power save mode or active mode at this time.

As represented by block 710, at some point in time the receiver 822 may receive data from the wireless terminal via the new wireless network. Again, the wireless terminal may be in power save mode or active mode at this time.

Referring now to FIG. 9, as mentioned above in some implementations the wireless device 800 may be implemented as an access point (e.g., access point 104 in FIG. 1) that coordinates with another access point (e.g., access point 106). Here, the other access point may be associated with an existing WLAN.

To support this coordination, the access point 800 may comprise a traffic coordinator 824 and an information acquisition component 806 that are configured to optionally acquire information regarding another WLAN by, for example, communicating with a complementary component of the other access point. This communication may be accomplished, for example, via a back-end communication link (e.g., via the WAN 108), via a wireless channel, or via some other communication link.

As represented by block 904 the information acquisition component 806, in conjunction with the receiver 822, may receive information such as beacon transmission times from the other access point. In some aspects this operation may be performed by the wireless device 800 during initialization upon power-up or at some other time.

As a represented by block 906, the network controller 808 may define beacon transmission times for a new WLAN based on information received from the other WLAN. Here, the access points may avoid the overlap of beacons on the different WLANs by ensuring that the beacons are interleaved in time. Moreover, in some implementations the access points may regularly coordinate to ensure that relative synchronization is maintained over time between the beacon transmission times of the two WLANs to avoid beacon overlap.

As represented by block 908, in some implementations the access points may coordinate to prevent overlapping beacon transmissions by allowing a wireless terminal to define a listen interval that is different than the beacon interval. In this way, a wireless terminal may configure its listen intervals, for example, as described above in conjunction with FIG. 5.

As represented by block 910, the access points also may coordinate with one another regarding the status of the wireless terminal. For example, a wireless terminal identifier 826 may identify a wireless terminal that is concurrently associated with a WLAN supported by the access point 800 and another WLAN supported by another access point. This identification operation may involve, for example, receiving information from the other access point or from the wireless terminal that indicates that the wireless terminal is concurrently associated with multiple WLANs.

In some aspects the coordination of block 910 may involve the exchange of status information relating to the wireless terminal. For example, the traffic coordinator 824 may receive status information from the other access point and/or may send status information to the other access point.

The status information relating to the wireless terminal may take various forms. For example, in some implementations the status information may indicate whether the wireless terminal is in power save mode or active mode on a particular WLAN. In some implementations the status information indicates the listen interval of the wireless terminal on a particular WLAN. In some implementations the status information indicates whether data is queued for transmission to the wireless terminal or for transmission from the wireless terminal. In some implementations the status information indicates whether the wireless terminal is current involved in a data transfer operation on a given WLAN.

The access point 800 may maintain this wireless terminal status information in an appropriate data memory 828. That is, the data memory 828 may maintain information that was received from another WLAN or that was obtained from its WLAN (and optionally transmitted to the other WLAN).

As represented by block 912, data transfer to and/or from the wireless terminal may be controlled based on the status information. For example, the access point 800 may buffer any data it has that is destined for the wireless terminal in the event the access point 800 determines that the wireless terminal is currently transferring data on another WLAN (regardless of whether the wireless terminal is in power save mode on the WLAN of the access point 800). Similarly, the access point 800 may buffer data for the wireless terminal if the access point 800 determines that the wireless terminal is currently in power save mode on the other WLAN or if the access point 800 determines that there is data buffered for the wireless terminal on the other WLAN. Also, the access point 800 may define beacon information based on the wireless terminal status information. For example the access point 800 may adjust the timing (e.g., beacon start time and beacon interval) of its beacon transmissions based on information it receives regarding the listen interval of the wireless terminal on another WLAN.

Referring now to FIG. 10, in some implementations the wireless device 800 may establish multiple WLANs. In such cases, coordination associated with these WLANs may simply involve internal operations of the wireless device 800.

At block 1002, the wireless device 800 establishes a first WLAN. In conjunction with this operation, the wireless device 800 may define the beacon transmission times for the first WLAN.

At block 1004, at some point in time the wireless device 800 may elect to establish a second WLAN. As mentioned above, these WLANs may be associated with the same service set identifier or different service set identifiers.

In the implementation of FIG. 10, coordination associated with the different WLANs may thus involve, in part, the wireless device 800 defining the beacon transmission times of the second WLAN based on information the wireless device 800 maintains regarding the beacon transmission times of the first WLAN. Again, these beacon transmission times may be defined to avoid overlapping beacons on the different WLANs at block 1006.

As represented by block 1008, coordination associated with the different WLANs also may involve the wireless device 800 sharing information between its WLANs regarding the status of a wireless terminal that is associated with each of the WLANs. As mentioned above, the status information may be maintained in the data memory 828.

The wireless device 800 also may utilize this status information in a similar manner as discussed above in conjunction with FIG. 9. Thus, a wireless device 800 may determine whether and/or how to transfer data to and from the wireless terminal based on the status of the wireless terminal (block 1010).

Referring to FIG. 11, in some implementations the wireless device 800 may adapt the beacon transmission times of an existing WLAN. These operations may be performed in conjunction with, for example, an infrastructure WLAN or an ad hoc WLAN.

At block 1102 the wireless device 800 establishes communication with a first wireless network. For example, in an infrastructure network this operation may involve an access point establishing a WLAN. In contrast, in an ad hoc network this operation may involve a wireless station either establishing the ad hoc network or joining (e.g., associating with) the ad hoc network.

At block 1104 the wireless device 800 may regularly monitor one or more designated wireless channels to determine the beacon transmission times of any neighboring WLANs. In some cases this may involve scanning all of the channels the wireless device 800 is associated with, to determine whether there's been a change in the beacon transmission times of any of the WLANs. In some cases this may involve identifying a new WLAN with which the wireless device 800 has associated.

In any event, as represented by block 1106 the wireless device 800 may adapt the beacon transmission times of the first WLAN to avoid overlap with any beacon transmission times identified at block 1104. Here, adaptations of the beacon transmission times may involve advancing or delaying the currently defined transmission times of beacons associated with a given WLAN.

In implementations where the adaptation is performed by an access point, the access point may adjust the beacon transmission times of the WLAN it established. In some cases the access point may adjust the beacon transmission times in a gradual manner to avoid any potential disruptions in the receptions of the beacons at any other wireless devices (e.g., wireless terminals) that are associated with the WLAN. For example, to affect a 40 millisecond shift in the beacon transmission times, the access point may perform 40 one millisecond adjustments of the beacon transmission time over a given period of time.

In implementations where the adaptation is performed by a wireless terminal associated with an ad hoc WLAN, the wireless terminal (e.g., a beacon generator 430 in FIG. 4) may adjust the timing of any beacons that it transmits for the ad hoc WLAN. For example, whenever the shared beacon generation scheme for the ad hoc WLAN indicates that this wireless terminal is to generate the next beacon for the ad hoc WLAN, the wireless terminal may transmit the beacon either before or after the previously designated beacon transmission time. This shift in the beacon transmission timing may therefore affect the timing of subsequent beacon transmissions by this wireless station or any other wireless station in the ad hoc WLAN. As in the access point case, the wireless terminal may adjust the beacon transmission times in a gradual manner (e.g., over several beacon transmissions).

It should be appreciated that various modifications may be made to the disclosed embodiments based on the teachings herein. For example, the teachings herein may be applicable to different types of networks, and to the splitting of different types of traffic. Here, other ways may be used to identify a network and associated network information, or to define beacon transmission times to avoid overlaps or otherwise adapt beacon timing. Different techniques may be used to coordinate between two or more devices to share information, and such information may be used in different ways and may relate to other aspects of a wireless terminal. In addition, power save mode may be implemented in different ways to control the transfer of data to a wireless station.

Figure 12:
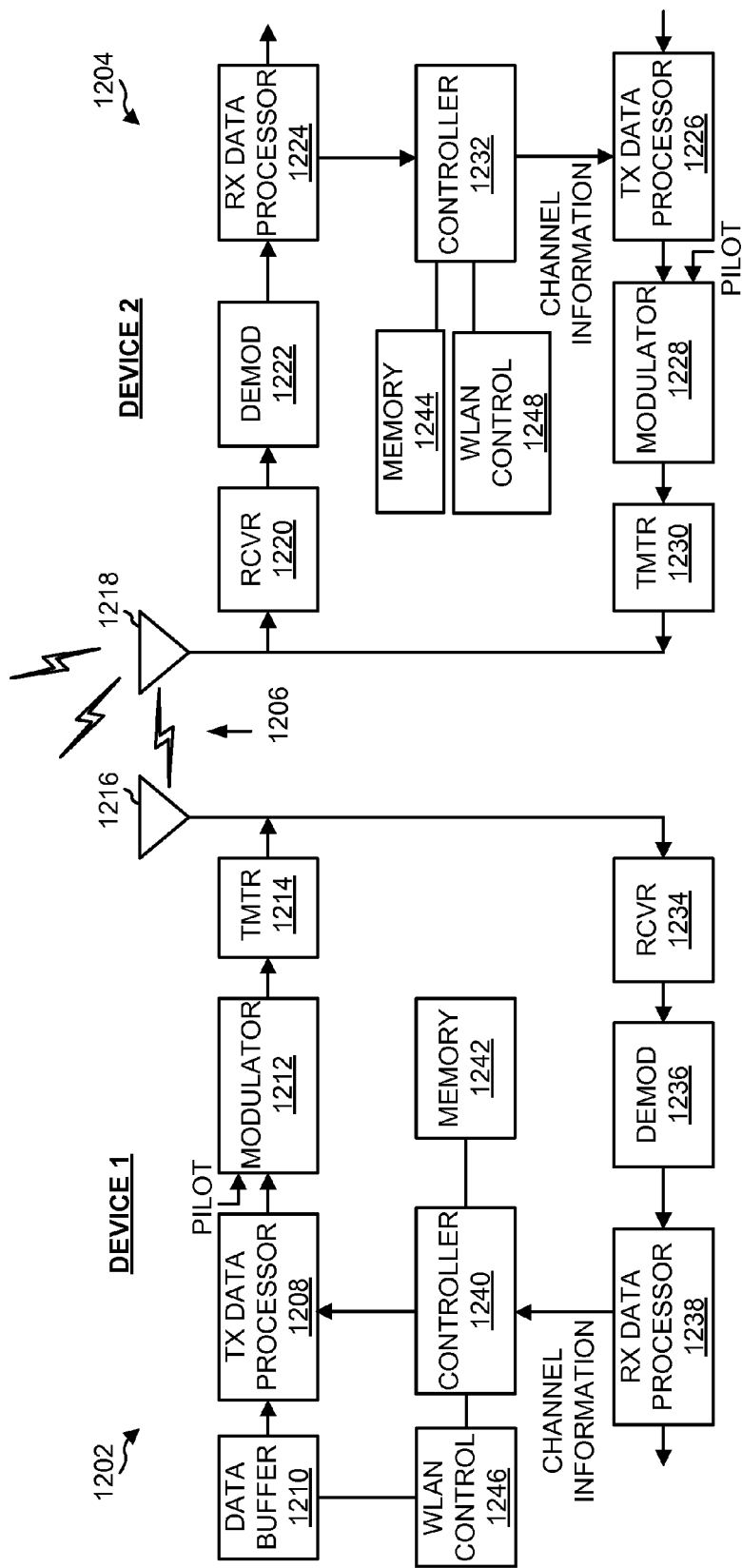
FIG. 12 is a simplified block diagram of several sample aspects of communication components.

The teachings herein may be incorporated into a device employing various components for communicating with at least one other wireless device. FIG. 12 depicts several sample components that may be employed to facilitate communication between devices. Here, a first device 1202 (e.g., an access terminal) and a second device 1204 (e.g., an access point) are adapted to communicate via a wireless communication link 1206 over a suitable medium.

Initially, components involved in sending information from the device 1202 to the device 1204 (e.g., a reverse link) will be treated. A transmit ("TX") data processor 1208 receives traffic data (e.g., data packets) from a data buffer 1210 or some other suitable component. The transmit data processor 1208 processes (e.g., encodes, interleaves, and symbol maps) each data packet based on a selected coding and modulation scheme, and provides data symbols. In general, a data symbol is a modulation symbol for data, and a pilot symbol is a modulation symbol for a pilot (which is known a priori). A modulator 1212 receives the data symbols, pilot symbols, and possibly signaling for the reverse link, and performs modulation (e.g., OFDM or some other suitable modulation) and/or other processing as specified by the system, and provides a stream of output chips. A transmitter ("TMTR") 1214 processes (e.g., converts to analog, filters, amplifies, and frequency upconverts) the output chip stream and generates a modulated signal, which is then transmitted from an antenna 1216.

The modulated signals transmitted by the device 1202 (along with signals from other devices in communication with the device 1204) are received by an antenna 1218 of the device 1204. A receiver ("RCVR") 1220 processes (e.g., conditions and digitizes) the received signal from the antenna 1218 and provides received samples. A demodulator ("DEMOD") 1222 processes (e.g., demodulates and detects) the received samples and provides detected data symbols, which may be a noisy estimate of the data symbols transmitted to the device 1204 by the other device(s). A receive ("RX") data processor 1224 processes (e.g., symbol demaps, deinterleaves, and decodes) the detected data symbols and provides decoded data associated with each transmitting device (e.g., device 1202).

Components involved in sending information from the device 1204 to the device 1202 (e.g., a forward link) will be now be treated. At the device 1204, traffic data is processed by a transmit ("TX") data processor 1226 to generate data symbols. A modulator 1228 receives the data symbols, pilot symbols, and signaling for the forward link, performs modulation (e.g., OFDM or some other suitable modulation) and/or other pertinent processing, and provides an output chip stream, which is further conditioned by a transmitter ("TMTR") 1230 and transmitted from the antenna 1218. In some implementations signaling for the forward link may include power control commands and other information (e.g., relating to a communication channel) generated by a controller 1232 for all devices (e.g. terminals) transmitting on the reverse link to the device 1204.

At the device 1202, the modulated signal transmitted by the device 1204 is received by the antenna 1216, conditioned and digitized by a receiver ("RCVR") 1234, and processed by a demodulator ("DEMOD") 1236 to obtain detected data symbols. A receive ("RX") data processor 1238 processes the detected data symbols and provides decoded data for the device 1202 and the forward link signaling. A controller 1240 receives power control commands and other information to control data transmission and to control transmit power on the reverse link to the device 1204.

The controllers 1240 and 1232 direct various operations of the device 1202 and the device 1204, respectively. For example, a controller may determine an appropriate filter, reporting information about the filter, and decode information using a filter. Data memories 1242 and 1244 may store program codes and data used by the controllers 1240 and 1232, respectively.

FIG. 12 also illustrates that the communication components may include one or more components that perform WLAN operations as taught herein. For example, a WLAN control component 1246 may cooperate with the controller 1240 and/or other components of the device 1202 to send and receive signals to another device (e.g., device 1204) as taught herein. Similarly, a WLAN control component 1248 may cooperate with the controller 1232 and/or other components of the device 1204 to send and receive signals to another device (e.g., device 1202).

If multiple WLANs are deployed in separate bands, a wireless terminal may incorporate separate radio frequency chains (e.g., involving additional radio frequency and PHY hardware). If multiple WLANs are deployed in separate channels in the same band, separate radio frequency chains may not be employed. In this case, however, simultaneous operation may involve support for fast switching between channels. In some aspects, MAC and other upper layer software may be employed in a multitasking mode to support simultaneous operation.

The teachings herein may be incorporated into (e.g., implemented within or performed by) a variety of apparatuses (e.g., devices). For example, a wireless device may be configured or referred to as an access point ("AP"), NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology. Other wireless devices (e.g., wireless terminals) also may be referred to as subscriber stations. A subscriber station also may be known as a subscriber unit, a mobile station, a remote station, a remote terminal, an access terminal, a user terminal, a user agent, a user device, or user equipment. In some implementations a subscriber station may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless medium.

As mentioned above, in some aspects a wireless device may comprise an access device (e.g., a cellular or Wi-Fi access point) for a communication system. Such an access device may provide, for example, connectivity for or to a network (e.g., a wide area network such as the Internet or a cellular network) via a wired or wireless communication link. Accordingly, the access device may enable another device (e.g., a Wi-Fi station) to access the network or some other functionality.

A wireless device may communicate via one or more wireless communication links that are based on or otherwise support any suitable wireless communication technology. For example, in some aspects a wireless device may associate with a network. In some aspects the network may comprise a body area network or a personal area network. In some aspects the network may comprise a local area network or a wide area network. A wireless device may support or otherwise use one or more of a variety of wireless communication technologies, protocols, or standards such as, for example, CDMA, TDMA, OFDM, OFDMA, WiMAX, and Wi-Fi. Similarly, a wireless device may support or otherwise use one or more of a variety of corresponding modulation or multiplexing schemes. A wireless device may thus include appropriate components (e.g., air interfaces) to establish and communicate via one or more wireless communication links using the above or other wireless communication technologies. For example, a device may comprise a wireless transceiver with associated transmitter and receiver components (e.g., transmitters 426 and 818 and receivers 404 and 822) that may include various components (e.g., signal generators and signal processors) that facilitate communication over a wireless medium.

Figure 13:
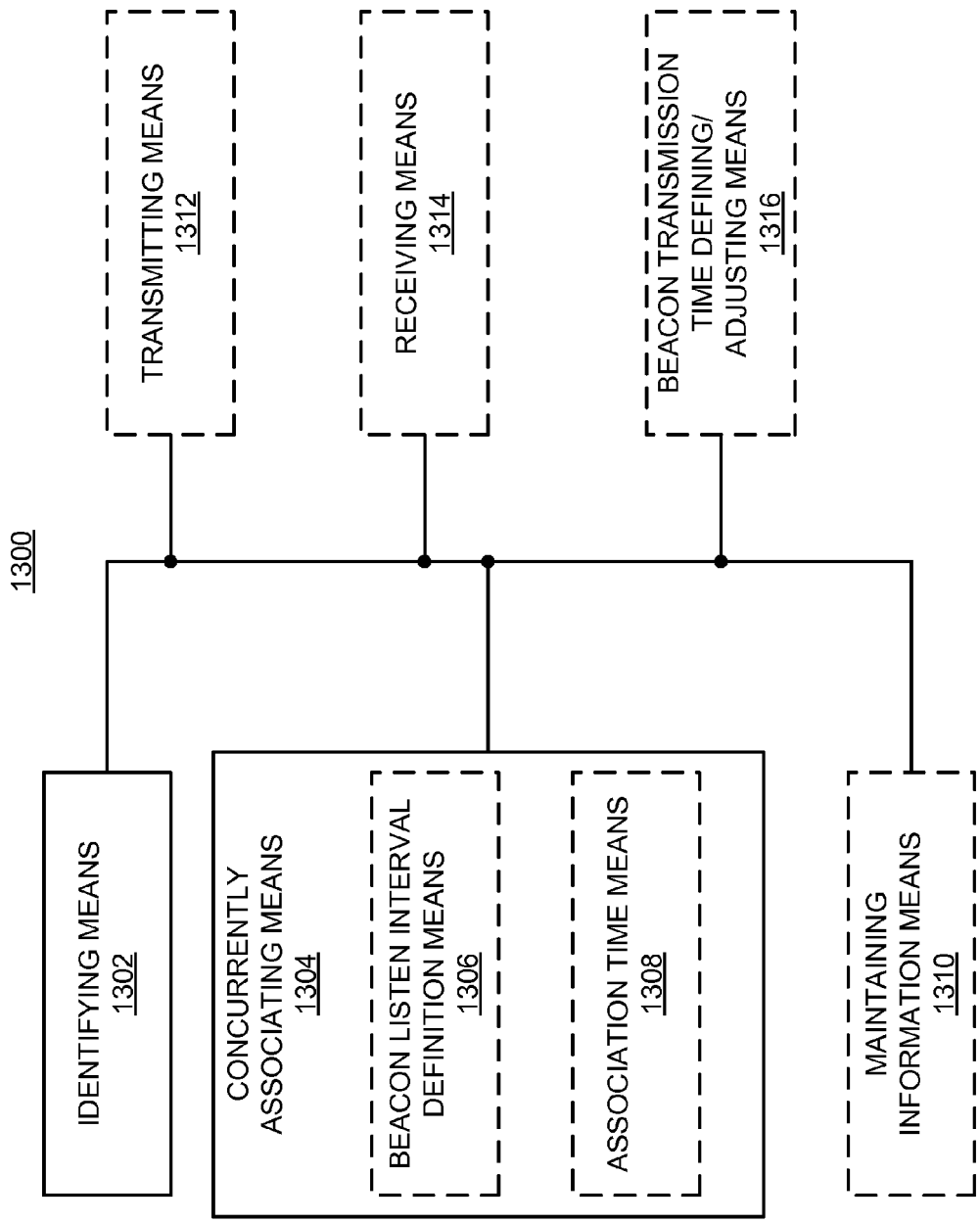
FIGS. 13-15 are several simplified block diagrams of several sample aspects of apparatuses configured to support concurrent operation in multiple wireless networks.
Figure 14:
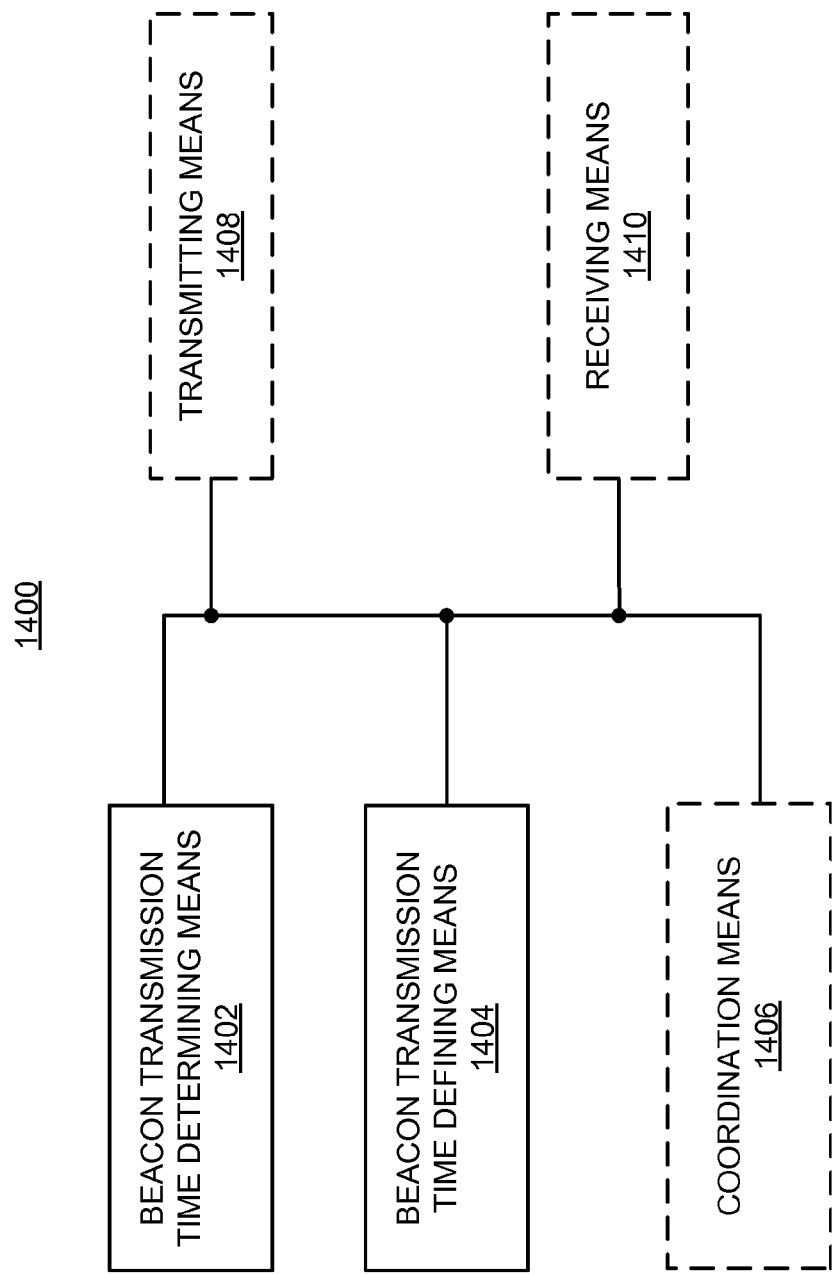
Figure 15:
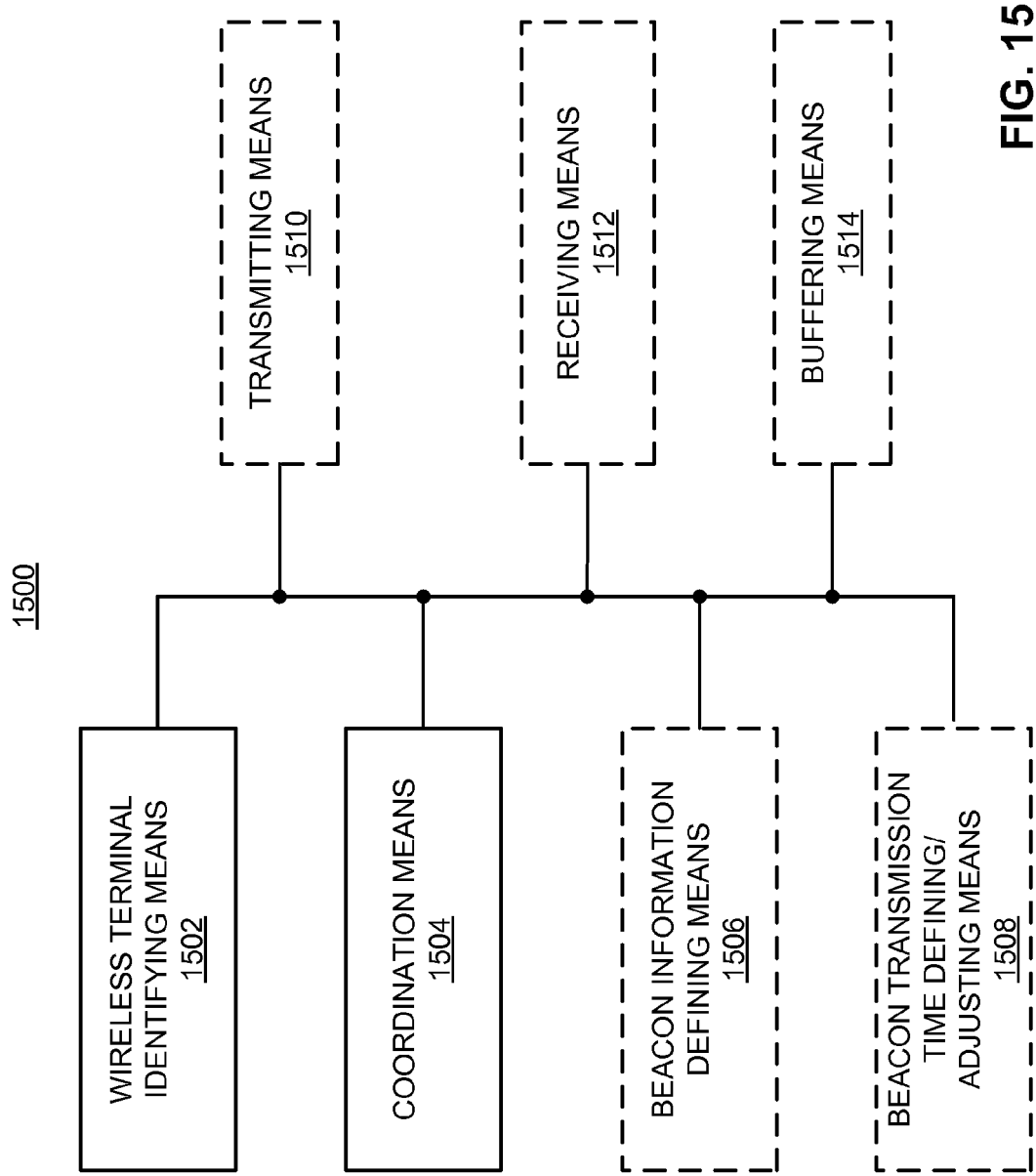

The components described herein may be implemented in a variety of ways. Referring to FIGS. 13-15, apparatuses 1300, 1400, and 1500 are each represented as a series of interrelated functional blocks. In some aspects the functionality of these blocks may be implemented as a processing system including one or more processor components. In some aspects the functionality of these blocks may be implemented using, for example, at least a portion of one or more integrated circuits (e.g., an ASIC). As discussed herein, an integrated circuit may include a processor, software, other structure discussed herein, other components, or some combination thereof. The blocks of FIGS. 13-15 also may be implemented in some other manner as taught herein. In some aspects one or more of the components represented by dashed boxes in FIGS. 13-15 are optional.

The apparatuses 1300, 1400, and 1500 may include one or more modules that may perform one or more of the functions described above with regard to various figures. For example, an identifying means 1302 may correspond to, for example, a network identifier as discussed herein. A concurrently associating means 1304 may correspond to, for example, a network controller as discussed herein. A beacon listen interval definition means 1306 may correspond to, for example, a listen interval selector as discussed herein. An association time means 1308 may correspond to, for example, an association timing selector as discussed herein. A maintaining information means 1310 may correspond to, for example, a memory as discussed herein. A transmitting means 1312, 1408, or 1510 may correspond to, for example, a transmitter as discussed herein. A receiving means 1314, 1410, or 1512 may correspond to, for example, a receiver as discussed herein. A beacon transmission time defining/adjusting means 1316 may correspond to, for example, a beacon generator as discussed herein. A beacon transmission time determining means 1402 may correspond to, for example, a beacon timing processor as discussed herein. A beacon transmission time defining means 1404 may correspond to, for example, a beacon generator as discussed herein. A coordination means 1406 or 1504 may correspond to, for example, a traffic coordinator as discussed herein. A wireless terminal identifying means 1502 may correspond to, for example, a wireless terminal identifier as discussed herein. A beacon information defining means 1506 and a beacon transmission time defining/adjusting means 1508 may correspond to, for example, a beacon generator as discussed herein. A buffering means 1514 may correspond to, for example, a network controller as discussed herein.

It should be understood that any reference to an element herein using a designation such as "first," "second," and so forth does not generally limit the quantity or order of those elements. Rather, these designations are used herein as a convenient method of distinguishing between two or more different elements. Thus, a reference to first and second elements does not mean that only two elements may be employed there or that the first element must precede the second element in some manner. Also, unless stated otherwise a set of elements may comprise one or more elements.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:

1. A method of wireless communication, comprising:
identifying a first wireless local area network and a second wireless local area network;
concurrently associating a mobile device with the first wireless local area network on a first channel and the second wireless local area network on a second channel different from the first channel, wherein the first wireless local area network transmits a first beacon at a first beacon interval, and the second wireless local area network transmits a second beacon at a second beacon interval, wherein the second beacon interval is at least partially concurrent with the first beacon interval;
concurrently operating the mobile device in power save mode on each of the first wireless local area network and the second wireless local area network to control transmission of downlink data over the first and the second wireless local area networks; and
defining, by the mobile device, a first beacon listen interval for receiving the first beacon and a second beacon listen interval for receiving the second beacon, wherein the second beacon listen interval is different from the first beacon listen interval, wherein the first beacon listen interval is a first integer multiple of the first beacon interval and the second beacon listen interval is a second integer multiple of the second beacon interval such that at least one of the first beacons transmitted at the first beacon interval is outside of the first beacon listen interval and such that at least one of the second beacons transmitted at the second beacon interval is outside of the second beacon listen interval, and wherein the second integer multiple is different from the first integer multiple.

2. The method of claim 1, further comprising receiving the first beacon in the first beacon listen interval and receiving the second beacon in the second beacon listen interval, wherein respective beacons transmitted at the first beacon interval and transmitted at the second beacon interval are concurrently transmitted.

3. The method of claim 1, wherein defining the first beacon listen interval and the second beacon listen interval further comprises defining a time to associate with one of the first and second wireless local area network to facilitate reception of information associated with beacons that are concurrently transmitted over the first and second wireless local area networks;
wherein defining the second beacon listen interval further comprises defining a second time that does not include a desired one of the first beacon from the first wireless local area network; and
wherein defining the first beacon listen interval further comprises defining a first time that does not include a desired one of the second beacon from the second wireless local area network.

4. The method of claim 1, further comprising controlling transmission of downlink data over the first and second wireless local area networks.

5. The method of claim 1, further comprising:
receiving a beacon having a traffic indication map including an indicator bit from one of the first wireless local area network and the second wireless local area network; and
transmitting a poll message while in power save mode on the first and second wireless local area networks to retrieve downlink data via one of the first and second wireless local area networks in response to detecting the indicator bit.

6. The method of claim 1, further comprising receiving downlink data via one of the first and second wireless local area networks while in power save mode on the first and second wireless local area networks.

7. The method of claim 1, further comprising transmitting uplink data via one of the first and second wireless local area networks while in power save mode on the first and second wireless local area networks.

8. The method of claim 1, further comprising:
temporarily exiting power save mode on the first wireless local area network to receive a set of downlink data via the first wireless local area network, and
remaining in power save mode on the second wireless local area network while receiving the set of downlink data.

9. The method of claim 1, further comprising:
maintaining information indicative of related wireless local area networks;
wherein the identification of the first and second wireless local area networks for concurrent association is based on the maintained information; and
wherein the related wireless local area networks are identified for facilitating concurrent operations including partitioning a plurality of user traffic flows based upon handling capabilities of each of the related wireless local area networks in connection with types of the user traffic flows.

10. The method of claim 9, wherein the maintained information is learned after first discovery of overlapping coverage of the first and second wireless local area networks, wherein the maintained information at least comprises assigned listen intervals of the mobile device on each of the associated first and second wireless local area networks, and whether the mobile device is currently transferring data in the respective assigned listen interval on each of the associated first and second wireless local area networks.

11. The method of claim 9, wherein the first wireless local area network carries real-time traffic and the second wireless local area network carries best-effort traffic.

12. The method of claim 1, further comprising receiving data via the first and second wireless local area networks, wherein the data is received as a result of coordination between access points associated with the first and second wireless local area networks.

13. The method of claim 1, wherein the first and second wireless local area networks are associated with a common service set identifier.

14. The method of claim 1, wherein the first and second wireless local area networks are associated with different service set identifiers.

15. The method of claim 1, wherein:
the first wireless local area network comprises an infrastructure wireless local area network or an ad hoc wireless local area network; and
the second wireless local area network comprises an infrastructure wireless local area network or an ad hoc wireless local area network.

16. The method of claim 15, further comprising defining beacon transmission times for the ad hoc wireless local area network of the first wireless local area network to avoid overlap in transmission of beacons on the first and second wireless local area networks.

17. The method of claim 15, further comprising adjusting beacon transmission times for the ad hoc wireless local area network of the first wireless local area network to avoid concurrent transmission of beacons on the first and second wireless local area networks.

18. The method of claim 1, wherein the identification of the first and second wireless networks comprises detecting at least one network and/or defining at least one network.

19. The method of claim 18, wherein:
the detection of the at least one network comprises detecting at least one infrastructure wireless local area network and/or detecting at least one ad hoc wireless local area network; and
the defining of the at least one network comprises defining at least one ad hoc wireless local area network.

20. An apparatus for wireless communication, comprising:
a network identifier configured to identify a first wireless local area network and a second wireless local area network, wherein the first wireless local area network transmits a first beacon in a first beacon interval, and the second wireless local area network transmits a second beacon in a second beacon interval, wherein the second beacon interval is at least partially concurrent with the first beacon interval; and
a network controller configured to concurrently associate at least one wireless terminal with the first wireless local area network on a first channel and the second wireless local area network on a second channel different from the first channel, the at least one wireless terminal concurrently operating in power save mode on each of the first wireless local area network and the second wireless local area network to control transmission of downlink data over the first and the second wireless local area networks;

wherein the network controller is configured to define a first beacon listen interval for receiving the first beacon and a second beacon listen interval for receiving a second beacon, wherein the second beacon listen interval is different from the first beacon listen interval, wherein the first beacon listen interval is a first integer multiple of the first beacon interval and the second beacon listen interval is a second integer multiple of the second beacon interval such that at least one of the first beacons transmitted at the first beacon interval is outside of the first beacon listen interval and such that at least one of the second beacons transmitted at the second beacon interval is outside of the second beacon listen interval, and wherein the second integer multiple is different from the first integer multiple.

21. The apparatus of claim 20, wherein the beacons are concurrently transmitted over the first and second wireless local area networks.

22. The apparatus of claim 20, wherein defining the first beacon listen interval and the second beacon listen interval further comprises defining a time to associate with one of the first and second wireless local area network to facilitate reception of information associated with beacons that are concurrently transmitted over the first and second wireless local area networks;

wherein defining the second beacon listen interval further comprises defining a second time that does not include a desired one of the first beacon from the first wireless local area network; and wherein defining the first beacon listen interval further comprises defining a first time that does not include a desired one of the second beacon from the second wireless local area network.

23. The apparatus of claim 20, further comprising a receiver configured to receive downlink data via one of the first and second wireless local area networks while the apparatus is in power save mode on the first and second wireless local area networks.

24. The apparatus of claim 20, further comprising a transmitter configured to transmit uplink data via one of the first and second wireless local area networks while the apparatus is in power save mode on the first and second wireless local area networks.

25. The apparatus of claim 20, further comprising:

a data memory configured to maintain information indicative of related wireless local area networks;

wherein the identification of the first and second wireless local area networks for concurrent association is based on the maintained information; and wherein the related wireless local area networks are identified for facilitating concurrent operations including partitioning a plurality of user traffic flows based upon handling capabilities of each of the related wireless local area networks in connection with types of the user traffic flows.

26. The apparatus of claim 25, wherein the maintained information is learned after first discovery of overlapping coverage of the first and second wireless local area networks, wherein the maintained information at least comprises assigned listen intervals of the mobile device on each of the associated first and second wireless local area networks, and whether the mobile device is currently transferring data in the respective assigned listen interval on each of the associated first and second wireless local area networks.

27. The apparatus of claim 20, wherein:

the first wireless local area network comprises an infrastructure wireless local area network or an ad hoc wireless local area network; and the second wireless local area network comprises an infrastructure wireless local area network or an ad hoc wireless local area network.

28. The apparatus of claim 27, further comprising a beacon generator configured to define beacon transmission times for the ad hoc wireless local area network of the first wireless local area network to avoid overlap in transmission of beacons on the first and second wireless local area networks.

29. The apparatus of claim 27, further comprising a beacon generator configured to adjust beacon transmission times for the ad hoc wireless local area network of the first wireless local area network to avoid concurrent transmission of beacons on the first and second wireless local area networks.

30. The apparatus of claim 20, wherein the network identifier is further configured to detect at least one network and/or define at least one network.

31. An apparatus for wireless communication, comprising:

means for identifying a first wireless local area network and a second wireless local area network;

means for concurrently associating a mobile device with the first wireless local area network on a first channel and the second wireless local area network on a second channel different from the first channel;

means for concurrently operating the mobile device in power save mode on each of the first wireless local area network and the second wireless local area network to control transmission of downlink data over the first and the second wireless local area networks; and means for defining, by the mobile device, a first beacon listen interval for receiving the first beacon and a second beacon listen interval for receiving the second beacon, wherein the second beacon listen interval is different from the first beacon listen interval, wherein the first beacon listen interval is a first integer multiple of the first beacon interval and the second beacon listen interval is a second integer multiple of the second beacon interval such that at least one of the first beacons transmitted at the first beacon interval is outside of the first beacon listen interval and such that at least one of the second beacons transmitted at the second beacon interval is outside of the second beacon listen interval, and wherein the second integer multiple is different from the first integer multiple.

32. A non-transitory computer-readable medium embodied with computer-program product for wireless communication, comprising computer executable instructions and further comprising:

code for causing a computer to identify a first wireless local area network and a second wireless local area network;

code for causing the computer to concurrently associate with the first wireless local area network on a first channel and the second wireless local area network on a second channel different from the first channel; and code for causing the computer to concurrently operate in power save mode on each of the first wireless local area network and the second wireless local area network to control transmission of downlink data over the first and the second wireless local area networks, codes for defining, by the computer, a first beacon listen interval for receiving the first beacon and a second beacon listen interval for receiving the second beacon, wherein the second beacon listen interval is different from the first beacon listen interval, wherein the first beacon listen interval is a first integer multiple of the first beacon interval and the second beacon listen interval is a second integer multiple of the second beacon interval such that at least one of the first beacons transmitted at the first beacon interval is outside of the first beacon listen interval and such that at least one of the second beacons transmitted at the second beacon interval is outside of the second beacon listen interval, and wherein the second integer multiple is different from the first integer multiple.

33. A method of wireless communication, comprising:
determining a first beacon interval for a first beacon transmission in a first wireless local area network;
defining a second beacon interval for a second beacon transmission in a second wireless local area; and
defining a first beacon listen interval for receiving the first beacon and a second beacon listen interval for receiving the second beacon, wherein the second beacon listen interval is different from the first beacon listen interval, wherein the first beacon listen interval is a first integer multiple of the first beacon interval and the second beacon listen interval is a second integer multiple of the second beacon interval such that at least one of the first beacons transmitted at the first beacon interval is outside of the first beacon listen interval and such that at least one of the second beacons transmitted at the second beacon interval is outside of the second beacon listen interval, and wherein the second integer multiple is different from the first integer multiple.

34. The method of claim 33, wherein the determination of beacon transmission times comprises scanning channels for beacons.

35. The method of claim 33, wherein the determination of beacon transmission times comprises receiving, from an access point, information indicative of the beacon transmission times of the first wireless local area network.

36. The method of claim 33, wherein:
an access point manages the first and second wireless local area networks; and
the determination of the beacon transmission times of the first wireless local area network comprises accessing information maintained by the access point for the first wireless local area network.

37. The method of claim 33, wherein the beacon transmission times for the second wireless local area network are defined in conjunction with establishing the second wireless local area network.

38. The method of claim 37, wherein the definition of the beacon transmission times for the second wireless local area network comprises defining a beacon start time associated with a beacon interval.

39. The method of claim 33, wherein:
an access point manages the first wireless local area network;
a wireless terminal is associated with the first and second wireless local area networks; and
the method further comprises coordinating with the access point to facilitate transferring data to and from the wireless terminal via the second wireless local area network.

40. The method of claim 39, wherein the coordination comprises transmitting status information associated with the wireless terminal to the access point or receiving status information associated with the wireless terminal from the access point.

41. The method of claim 40, wherein the status information relates to at least one of the group consisting of: whether the wireless terminal is in power save mode, whether the wireless terminal is currently transferring data in a listen interval of the wireless terminal, and whether data is queued for the wireless terminal.

42. The method of claim 33, wherein a wireless terminal concurrently associates with the first and second wireless local area networks and concurrently operates in power save mode on each of the first and second wireless local area networks to control transmission of downlink data to the wireless terminal via the first and second wireless local area networks.

43. The method of claim 33, wherein, while the wireless terminal is in power save mode on the first and second wireless local area networks, the wireless terminal transmits and receives data via the first and second wireless local area networks.

44. The method of claim 33, wherein the first wireless local area network is associated with a first channel and the second wireless local area network is associated with a second channel.

45. The method of claim 33, wherein the first and second wireless local area networks are associated with a common service set identifier.

46. The method of claim 33, wherein the first and second wireless local area networks are associated with different service set identifiers.

47. The method of claim 33, wherein:
the first wireless local area network comprises an infrastructure wireless local area network or an ad hoc wireless local area network; and
the second wireless local area network comprises an infrastructure wireless local area network or an ad hoc wireless local area network.

48. An apparatus for wireless communication, comprising:
a beacon timing processor configured to determine a first beacon interval for a first beacon transmission in a first wireless local area network;
a beacon generator configured to define a second beacon interval for a second beacon transmission in a second wireless local area; and
a processor configured to define a first beacon listen interval for receiving the first beacon and a second beacon listen interval for receiving the second beacon, wherein the second beacon listen interval is different from the first beacon listen interval, wherein the first beacon listen interval is a first integer multiple of the first beacon interval and the second beacon listen interval is a second integer multiple of the second beacon interval such that at least one of the first beacons transmitted at the first beacon interval is outside of the first beacon listen interval and such that at least one of the second beacons transmitted at the second beacon interval is outside of the second beacon listen interval, and wherein the second integer multiple is different from the first integer multiple.

49. The apparatus of claim 48, wherein the beacon timing processor is further configured to scan channels for beacons.

50. The apparatus of claim 48, wherein the beacon timing processor is further configured to receive, from an access point, information indicative of the beacon transmission times of the first wireless local area network.

51. The apparatus of claim 48, wherein:
the apparatus is implemented in an access point that manages the first and second wireless local area networks; and the beacon timing processor is further configured to determine the beacon transmission times of the first wireless local area network by accessing information maintained by the access point for the first wireless local area network.

52. The apparatus of claim 48, wherein the beacon generator is further configured to define the beacon transmission times for the second wireless local area network in conjunction with establishment of the second wireless local area network.

53. The apparatus of claim 52, wherein the definition of the beacon transmission times for the second wireless local area network comprises defining a beacon start time associated with a beacon interval.

54. The apparatus of claim 48, wherein:
an access point manages the first wireless local area network;
a wireless terminal is associated with the first and second wireless local area networks; and
the apparatus further comprises a traffic coordinator configured to coordinate with the access point to facilitate transferring data to and from the wireless terminal via the second wireless local area network.

55. The apparatus of claim 54, wherein the traffic coordinator is further configured to send status information associated with the wireless terminal to the access point and/or receive status information associated with the wireless terminal from the access point.

56. The apparatus of claim 48, wherein:
the first wireless local area network comprises an infrastructure wireless local area network or an ad hoc wireless local area network; and
the second wireless local area network comprises an infrastructure wireless local area network or an ad hoc wireless local area network.

57. An apparatus for wireless communication, comprising:
means for determining a first beacon interval for a first beacon transmission in a first wireless local area network;
means for defining a second beacon interval for a second beacon transmission in a second wireless local area; and
means for defining a first beacon listen interval for receiving the first beacon and a second beacon listen interval for receiving the second beacon, wherein the second beacon listen interval is different from the first beacon listen interval, wherein the first beacon listen interval is a first integer multiple of the first beacon interval and the second beacon listen interval is a second integer multiple of the second beacon interval such that at least one of the first beacons transmitted at the first beacon interval is outside of the first beacon listen interval and such that at least one of the second beacons transmitted at the second beacon interval is outside of the second beacon listen interval, and wherein the second integer multiple is different from the first integer multiple.

58. A non-transitory computer-readable medium embodied with computer-program product for wireless communication, comprising computer executable instructions and further comprising:
code for causing a computer to a first beacon interval for a first beacon transmission in a first wireless local area network;
code for causing the computer to define a second beacon interval for a second beacon transmission in a second wireless local area; and
code for causing the computer to define a first beacon listen interval for receiving the first beacon and a second beacon listen interval for receiving the second beacon, wherein the second beacon listen interval is different from the first beacon listen interval, wherein the first beacon listen interval is a first integer multiple of the first beacon interval and the second beacon listen interval is a second integer multiple of the second beacon interval wherein at least one of the first beacons transmitted at the first beacon interval is outside of the first beacon listen interval and wherein at least one of the second beacons transmitted at the second beacon interval is outside of the second beacon listen interval, and wherein the second integer multiple is different from the first integer multiple.

59. A method of wireless communication, comprising:
identifying at least one wireless terminal concurrently associated with a first wireless local area network on a first channel and a second wireless local area network on a second channel different from the first channel, wherein the first wireless local area network transmits a first beacon in a first beacon interval, and the second wireless local area network transmits a second beacon in a second beacon interval;
defining a first beacon listen interval for receiving the first beacon and a second beacon listen interval for receiving the second beacon, wherein the second beacon listen interval is different from the first beacon listen interval, wherein the first beacon listen interval is a first integer multiple of the first beacon interval and the second beacon listen interval is a second integer multiple of the second beacon interval such that at least one of the first beacons transmitted at the first beacon interval is outside of the first beacon listen interval and such that at least one of the second beacons transmitted at the second beacon interval is outside of the second beacon listen interval, and wherein the second integer multiple is different from the first integer multiple; and
coordinating with an access point associated with the second wireless local area network to control transfer of data to or from the at least one wireless terminal via the first wireless local area network.

60. The method of claim 59, wherein the coordination comprises receiving and sending the maintained information including status information associated with the wireless terminal from and to the access point, respectively, wherein the status information relates to at least one of the group consisting of: whether the wireless terminal is in power save mode, whether the wireless terminal is currently transferring data in a listen interval of the wireless terminal, and whether data is queued for the wireless terminal.

61. The method of claim 60, further comprising buffering data for the first wireless local area network based on the status information.

62. The method of claim 59, further comprising defining and adjusting beacon transmission times for the first wireless local area network to avoid concurrent transmission of beacons on the first and second wireless local area networks.

63. The method of claim 62, wherein defining the beacon transmission times for the first wireless local area network comprises defining a beacon start time associated with a beacon interval.

64. The method of claim 59, wherein the first and second wireless local area networks are associated with a common service set identifier.

65. The method of claim 59, wherein the first and second wireless local area networks are associated with different service set identifiers.

66. An apparatus for wireless communication, comprising:
a wireless terminal identifier configured to identify a wireless terminal concurrently associated with a first wireless local area network on a first channel and a second wireless local area network on a second channel different from the first channel, wherein the first wireless local area network transmits a first beacon in a first beacon interval, and the second wireless local area network transmits a second beacon in a second beacon interval, wherein the second beacon interval is at least partially concurrent with the first beacon interval;
a processor configured to define a first beacon listen interval for receiving the first beacon and a second beacon listen interval for receiving the second beacon, wherein the second beacon listen interval is different from the first beacon listen interval, wherein the first beacon listen interval is a first integer multiple of the first beacon interval and the second beacon listen interval is a second integer multiple of the second beacon interval such that at least one of the first beacons transmitted at the first beacon interval is outside of the first beacon listen interval and such that at least one of the second beacons transmitted at the second beacon interval is outside of the second beacon listen interval, and wherein the second integer multiple is different from the first integer multiple; and
a traffic coordinator configured to coordinate with an access point associated with the second wireless local area network to control transfer of data to or from the wireless terminal via the first wireless local area network.

67. The apparatus of claim 66, wherein the traffic coordinator is further configured to receive and send the maintained information including status information associated with the wireless terminal from and to the access point, respectively, wherein the status information relates to at least one of the group consisting of: whether the wireless terminal is in power save mode, whether the wireless terminal is currently transferring data in a listen interval of the wireless terminal, and whether data is queued for the wireless terminal.

68. The apparatus of claim 67, wherein the network controller is configured to buffer data for the first wireless local area network based on the status information.

69. The apparatus of claim 66, further comprising a beacon generator configured to define beacon transmission times for the first wireless local area network to avoid concurrent transmission of beacons on the first and second wireless local area networks.

70. The apparatus of claim 69, wherein the definition of the beacon transmission times for the first wireless local area network comprises defining a beacon start time associated with a beacon interval.

71. The apparatus of claim 66, further comprising a beacon generator configured to adjust beacon transmission times for the first wireless local area network to avoid concurrent transmission of beacons on the first and second wireless local area networks.

72. An apparatus for wireless communication, comprising:
means for identifying at least one wireless terminal concurrently associated with a first wireless local area network on a first channel and a second wireless local area network on a second channel different from the first channel, wherein the first wireless local area network transmits a first beacon in a first beacon interval, and the second wireless local area network transmits a second beacon in a second beacon interval, wherein the second beacon interval is at least partially concurrent with the first beacon interval;
means for defining a first beacon listen interval for receiving the first beacon and a second beacon listen interval for receiving the second beacon, wherein the second beacon listen interval is different from the first beacon listen interval, wherein the first beacon listen interval is a first integer multiple of the first beacon interval and the second beacon listen interval is a second integer multiple of the second beacon interval such that at least one of the first beacons transmitted at the first beacon interval is outside of the first beacon listen interval and such that at least one of the second beacons transmitted at the second beacon interval is outside of the second beacon listen interval, and wherein the second integer multiple is different from the first integer multiple; and
means for coordinating with an access point associated with the second wireless local area network to control transfer of data to or from the at least one wireless terminal via the first wireless local area network.

73. A non-transitory computer-readable medium embodied with computer-program product for wireless communication, comprising computer executable instructions and further comprising:
code for causing a computer to identify at least one wireless terminal concurrently associated with a first wireless local area network on a first channel and a second wireless local area network on a second channel different from the first channel, wherein the first wireless local area network transmits a first beacon in a first beacon interval, and the second wireless local area network transmits a second beacon in a second beacon interval, wherein the second beacon interval is at least partially concurrent with the first beacon interval;
code for causing the computer to define a first beacon listen interval for receiving the first beacon and a second beacon listen interval for receiving the second beacon, wherein the second beacon listen interval is different from the first beacon listen interval, wherein the first beacon listen interval is a first integer multiple of the first beacon interval and the second beacon listen interval is a second integer multiple of the second beacon interval wherein at least one of the first beacons transmitted at the first beacon interval is outside of the first beacon listen interval and wherein at least one of the second beacons transmitted at the second beacon interval is outside of the second beacon listen interval, and wherein the second integer multiple is different from the first integer multiple; and
code for causing the computer to coordinate with an access point associated with the second wireless local area network to control transfer of data to or from the wireless terminal via the first wireless local area network.

* * * * *